(12) United States Patent
Simpson et al.

(10) Patent No.: US 6,943,903 B2
(45) Date of Patent: Sep. 13, 2005

(54) SYSTEM AND METHOD FOR PROVIDING PRINT PREVIEW/MEDIA SELECTION

(75) Inventors: Shell S. Simpson, Boise, ID (US); Ward S. Foster, Boise, ID (US); Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 919 days.

(21) Appl. No.: 09/816,612

(22) Filed: Mar. 23, 2001

(65) Prior Publication Data

US 2002/0135798 A1 Sep. 26, 2002

(51) Int. Cl.$^7$ .......................... G06K 15/02; G06F 13/00
(52) U.S. Cl. .................... 358/1.12; 358/1.15; 358/1.13; 358/1.14
(58) Field of Search ................. 358/1.1–1.18; 399/23, 24, 8, 27

(56) References Cited

U.S. PATENT DOCUMENTS

| | | | |
|---|---|---|---|
| 5,640,580 A | 6/1997 | Slayden et al. | 395/789 |
| 5,652,901 A | 7/1997 | Slayden et al. | 395/789 |
| 5,680,629 A | 10/1997 | Slayden et al. | 395/789 |
| 5,682,541 A | 10/1997 | Martin | 395/768 |
| 6,108,009 A | 8/2000 | Nishikawa | 345/431 |
| 6,134,568 A | 10/2000 | Tonkin | 707/526 |
| 6,157,439 A | 12/2000 | Rousseau et al. | 355/61 |
| 6,631,010 B1 * | 10/2003 | Foster et al. | 358/1.15 |

* cited by examiner

*Primary Examiner*—Douglas Tran
(74) *Attorney, Agent, or Firm*—James R. McDaniel

(57) ABSTRACT

This invention relates to a Web-based imaging system that provides a print preview. Such systems of this type, generally, allow the user to preview the print job prior to printing of the print job. In particular, if the media to be printed upon is non-white, the system will provide the user with a view of how the print job will look on the non-white media.

16 Claims, 25 Drawing Sheets

SYSTEM AND METHOD FOR PROVIDING PRINT PREVIEW/MEDIA SELECTION

FIELD OF THE INVENTION

This invention relates to a Web-based imaging system that provides a print preview. Such systems of this type, generally, allow the user to preview the print job prior to printing of the print job. In particular, if the media to be printed upon is non-white, the system will provide the user with a view of how the print job will look on the non-white media.

DESCRIPTION OF THE RELATED ART

It is known, in the printing arts, to employ print preview technologies. These systems are utilized in order to eliminate trial and error to determine how the print job will look prior to printing. Exemplary of such prior is U.S. Pat. No. 5,640,580 ('580) to G. C. Slayden et al., entitled "Method and System for Previewing Computer Output," U.S. Pat. No. 5,652,901 ('901) to G. C. Slayden et al., entitled "Method and System for Previewing Computer Output," U.S. Pat. No. 5,680,629 ('629) to G. C. Slayden et al., entitled "Method and System for Previewing Computer Output," U.S. Pat. No. 5,682,541 ('541) to M. M. Martin, entitled "Preview System for Printed Documents," U.S. Pat. No. 6,108,009 ('009) to N. Nishikawa, entitled "Image Processing Method and Apparatus for Previewing Color Images," U.S. Pat. No. 6,134,568 ('568) to R. Tonkin, entitled "Previewing an Assembled Document," and commonly assigned U.S. Pat. No. 6,157,439 ('439) to P. Rousseau et al., entitled "Copy System with Document Previewing." While these references employ print preview technologies, they are not utilized in Web-based Imaging and they do not eliminate the trial and error technique of determining how the print job will look on the desired print media prior to printing. This is especially important if the print media is non-white.

It is apparent from the above that there exists a need in the art for a Web-based Imaging system that provides a print preview that allows the user to see how the print job will look on the media to be printed prior to printing, especially if the print media is non-white. It is a purpose of this invention to fulfill this and other needs in the art in a manner more apparent to the skilled artisan once given the following disclosure.

SUMMARY OF THE INVENTION

Generally speaking, this invention fulfills these needs by providing a method for print preview, comprising the steps of: selecting a document to be printed; accessing a Web imaging home page; selecting a target printer; viewing an image of the document on target printer home page; selecting a media upon which the document is to be printed; determining if the target printer can print the document on the media; and printing the document on the media.

In certain preferred embodiments, the document or portions of the document can be prepared by the user just prior to printing or the user can download the document or portions of the document from the Internet. Also, the Web imaging home page is located in the Web-based Imaging system. Finally, the determination step includes the steps of having the target printer send information to the target printer home page regarding the printer's capabilities and the media loaded in that printer.

In another further preferred embodiment, the print preview system allows the user to see how the print job will look on the media to be printed upon prior to the actual printing. This is particularly useful if the media to be printed upon is non-white.

The preferred print preview system, according to the present invention, offers the following advantages: ease of use; excellent print preview characteristics; ability to use a variety of print media; and excellent economy. In fact, in many of the preferred embodiments, these factors of print preview characteristics, use of a variety of print media, and economy are optimized to an extent that is considerably higher than heretofore achieved in prior, known print preview systems.

The above and other features of the present invention, which will become more apparent as the description proceeds, are best understood by considering the following detailed description in conjunction with the accompanying drawings, wherein like characters represent like parts throughout the several views and in which:

DETAILED DESCRIPTION OF THE INVENTION

Figure 1:
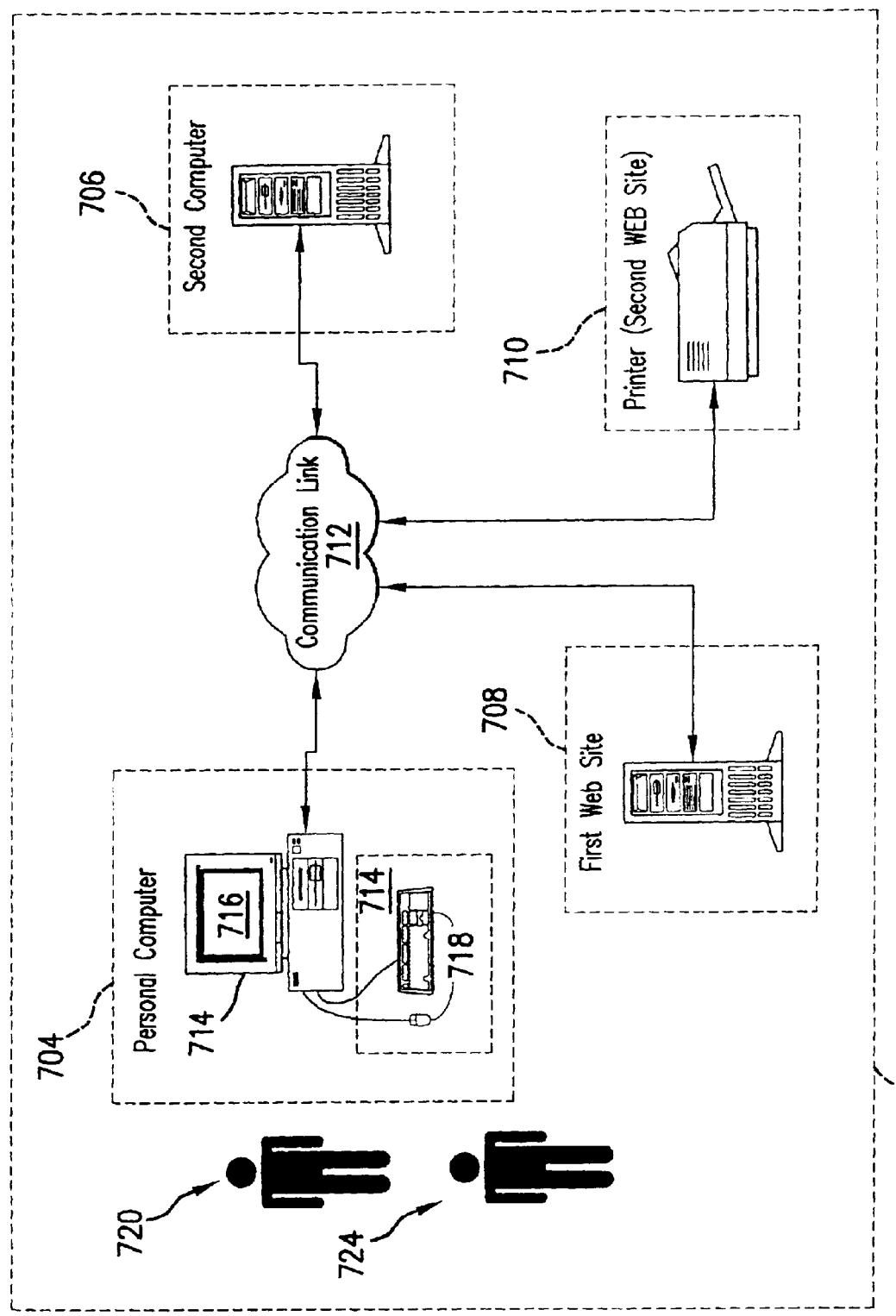
FIG. 1 illustrates an architectural diagram of a client-server system that operates in accordance with one embodiment of the present invention.

As set forth in commonly assigned U.S. patent application Ser. No. 09/712,336 to S. Simpson et al., entitled "System and Method for Processing Data in a Distributed Environment", which was filed on Nov. 13, 2000 and is incorporated entirely by reference, to facilitate a complete understanding of the invention the following terms and acronyms are used throughout the detailed description:

Client-Server. A model of interaction in a distributed system in which a program at one site sends a request to a program at another site and waits for a response. The requesting program is called the "client," and the program that responds to the request is called the "server." In the context of the World Wide Web (discussed below), the client is a "Web browser" (or simply "browser") which runs on a computer of a user; the program which responds to browser requests by serving Web pages, or other types of Web content, is commonly referred to as a "Web server."

Content. A set of executable instructions that is served by a server to a client and which is intended to be executed by the client so as to provide the client with certain functionality. Web content refers to content that is meant to be executed by operation of a Web browser. Web content, therefore, may include (the following is a non-exhaustive list) one or more of the following: HTML code, Java script™, Java Program(s) and C-"Sharp" code Hyperlink. A navigational link is from one document to another, from one portion (or component) of a document to another, or to a Web resource, such as a Java applet. Typically, a hyperlink is displayed as a highlighted word or phrase that can be selected by clicking on it using a mouse to jump to the associated document or document portion or to retrieve a particular resource.

Hypertext System. A computer-based informational system in which documents (and possibly other types of data entities) are linked together via hyperlinks to form a user-navigable "Web."

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations that may be made in the future, including changes and additions to existing standard protocols.)

World Wide Web ("Web"). Used herein to refer generally to both (i) a distributed collection of interlinked, user-viewable Hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols that may be used in place of (or in addition to) HTML and HTTP.

Web Site. A computer system that serves informational content over a network using the standard protocols of the World Wide Web. Typically, a Web site corresponds to a particular Internet domain name, such as "HP.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users. Importantly, a Web Site can have additional functionality, For example, a Web site may have the ability to print documents, scan documents, etc.

HTML (HyperText Markup Language ). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or HTML document) is subsequently transferred from a Web server to a browser, the codes are interpreted by the browser and used to display the document. Additionally in specifying how the Web browser is to display the document, HTML tags can be used to create links to other Web documents (commonly referred to as "hyperlinks"). For more information on HTML, see Ian S. Graham, The HTML Source Book, John Wiley and Sons, Inc., 1995 (ISBN 0471-11894-4).

HTTP (HyperText Transport Protocol). The standard World Wide Web client-server protocol used for the exchange of information (such as HTML documents, and client requests for such documents) between a browser and a Web server. HTTP includes a number of different types of messages that can be sent from the client to the server to request different types of server actions. For example, a "GET" message, which has the format GET <URL>, causes the server to return the document or file located at the specified URL.

URL (Uniform Resource Locator . . . A unique address which fully specifies the location of a file or other resource on the Internet or a network. The general format of a URL is protocol:

//machine address:port/path/filename.

FIG. 1 illustrates the general architecture of a computing system 702 that is in accordance with the invention. The computing system 702 includes a personal computer 704, a second computer 706, a first Web site 708 and a printer 710. The printer 710 also functions as a Web site.

All the devices depicted in FIG. 1 are able to communicate over a communication link 712. Furthermore, the communication link 712 may represent a network, a series of networks, a wireless network(s), the Internet, or any combination thereof.

The personal computer 704 may be any type of computing device that allows a user to interactively browse Web Sites and to perform the functions that are described below. For example, the personal computer 704 may be a personal computer that runs a local operating system, such as a version of MICROSOFT WINDOWS, NT, UNIX or Linux, etc. As shown, the personal computer 704 includes a user interface 714. The user interface 714 includes a display monitor 716 and a user input device(s) 718 for allowing the user to provide input to the computer 704. In this example, the input devices 718 include a keyboard and a mouse. For purposes of the later discussion, it is noted that personal computer 704 is used by multiple users, each having their own user profile. Two of these users, a first user 720, and a second user 724 are depicted. It is assumed that each one of these users has his/her own user profile information and identifier (i.e., user name) stored in the personal computer 704.

For purposes of the later discussion, a user presently logged in to the personal computer 704 at any point in time is referred to herein as the "active user". Thus, if the first user 720 is presently logged into the personal computer 704, that user is presently the "active user".

It is important to note that the devices depicted in FIG. 1 are all in accordance with a system wide standard. Accordingly, this standard specifies a set of generic access requests that are intended to cause an executing computer to access a set of target data describing a target image. In this case, however, each user can have his/her own target image. The target data accessed in response to these requests at any point in time is the target data that is associated with the active user. FIGS. 2–5 are used to illustrate this concept further.

Figure 2:
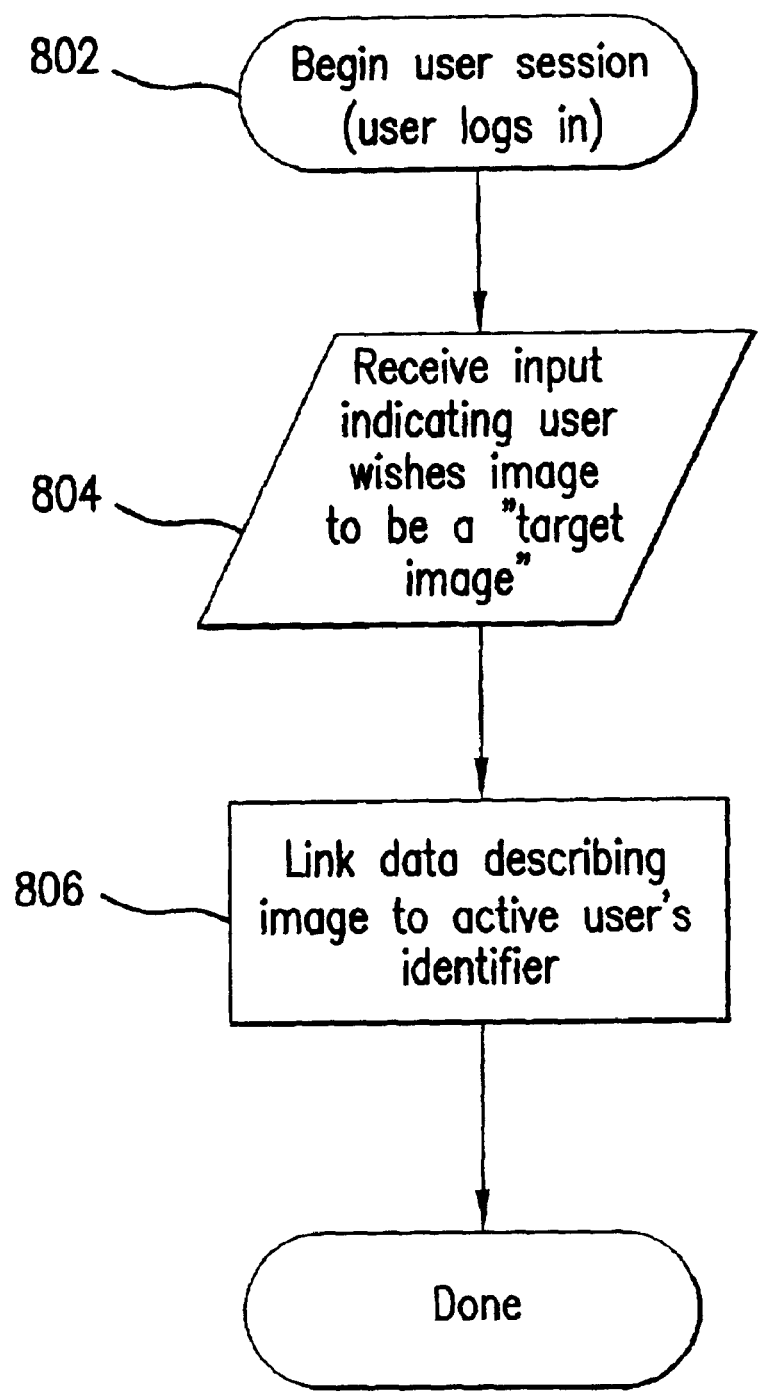
FIG. 2 is a flow diagram illustrating how a personal computer can be operated to identify and store a set of target data.

FIG. 2 is a flow diagram for showing, very generally, how the personal computer 704 can be operated to identify and store a set of target data. As indicated in FIG. 2, a user (e.g., the first user 720 or the second user 724) is assumed to log into to the personal computer 704 (step 802). The personal computer 704 responds in a conventional manner by retrieving the user's preferences and desktop configuration. In this manner, the user becomes the "active user".

Next, it is assumed that the active user provides input that he/she wishes a particular image to be a "target image". The computer 704 receives this input at step 804. In response, the computer 704 responds by identifying the data describing the image as "target data" (step 806). In addition, the computer 704 operates to link the target data to the identifier assigned to the active user 720 (step 806). In this manner, the target data becomes associated with the active user.

Figure 3:
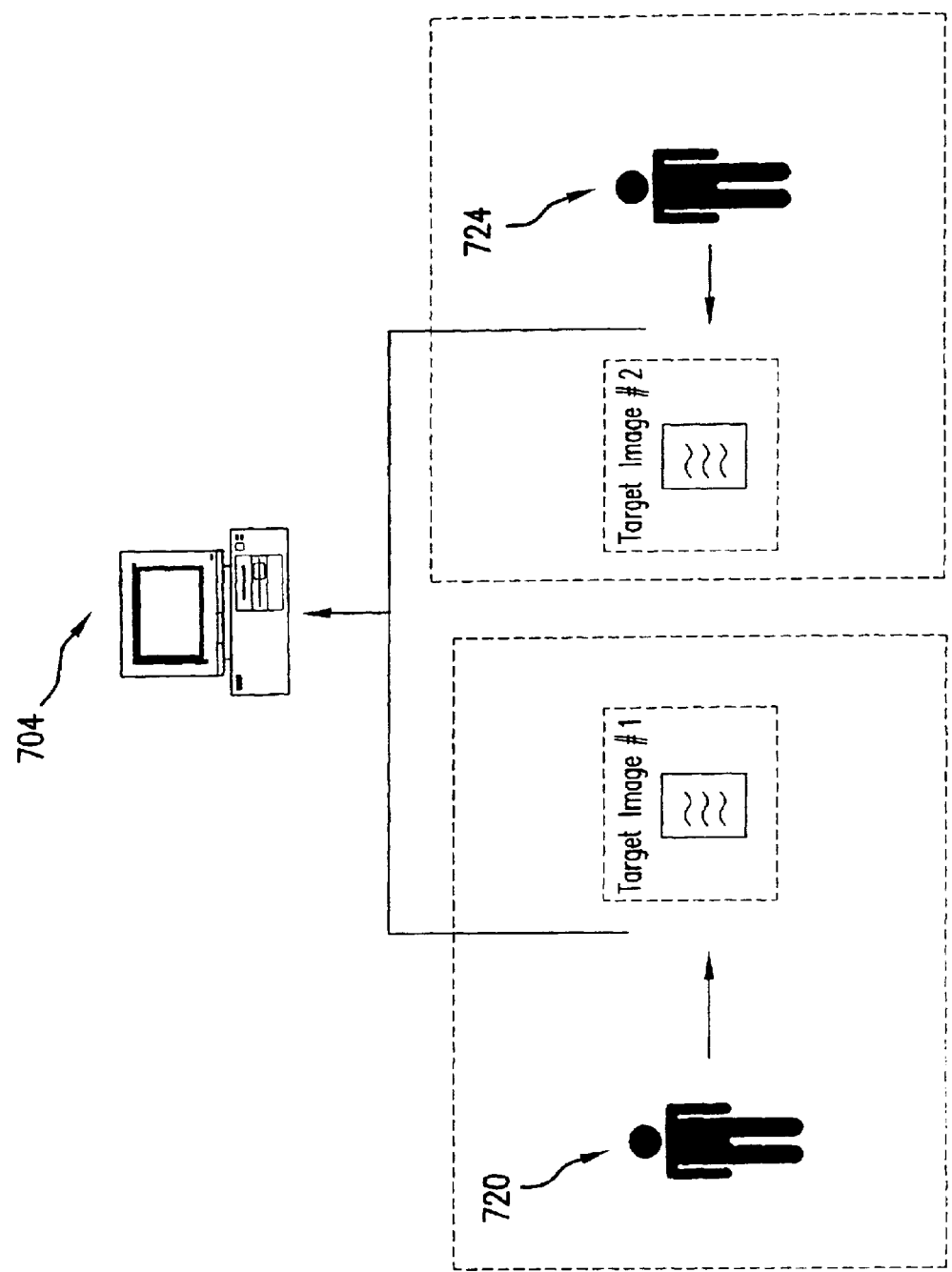
FIG. 3 is an abstract drawing of the personal computer under certain conditions.
Figure 4:
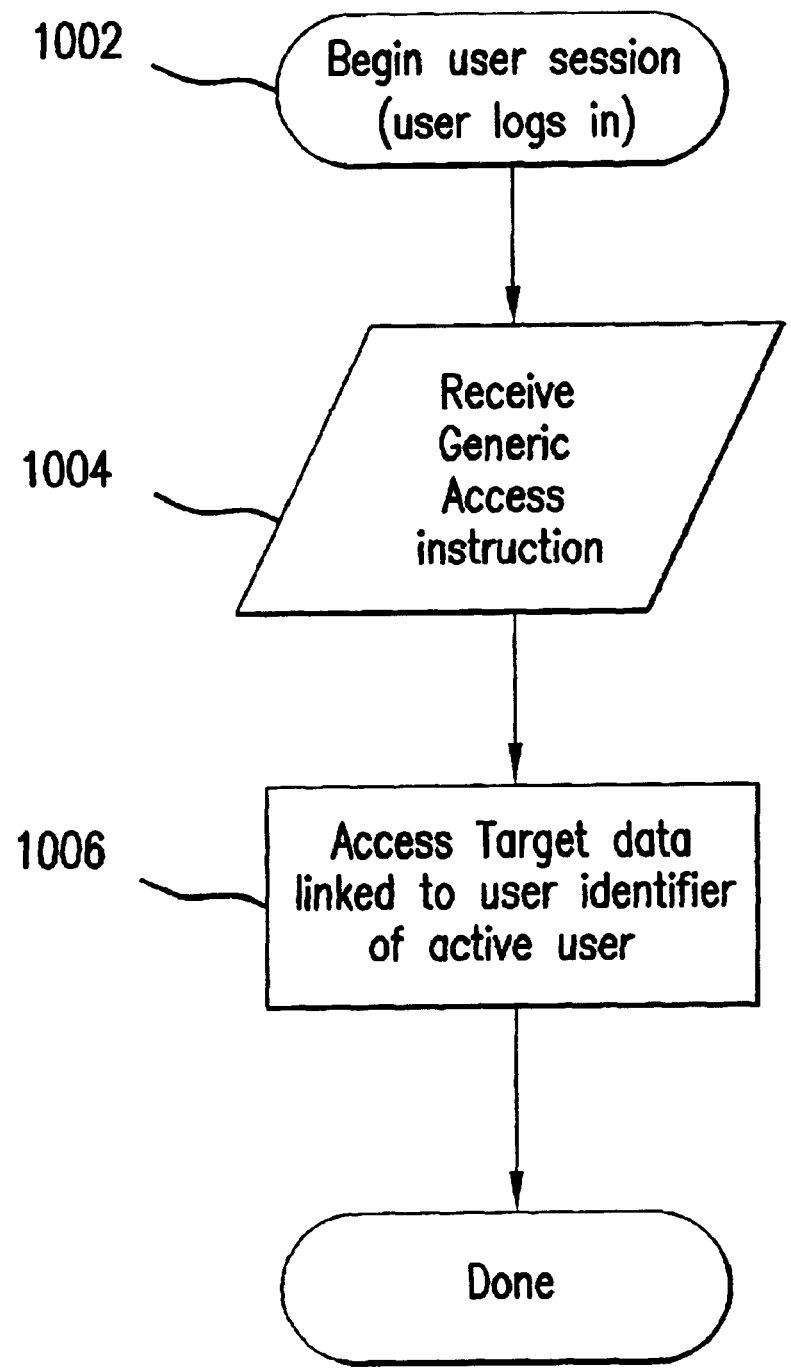
FIG. 4 illustrates very generally the operation of the personal computer in response to a generic access instruction, assuming the conditions depicted in FIG. 3.

Now consider FIGS. 3 and 4. FIG. 3 is an abstract drawing of the personal computer 704 under the following scenario. First, it is assumed that the first user 720 has previously interacted with the personal computer to identify a first target image (target image #1). As a result, the data representing this image has been identified, by the personal computer 704, as target data (target data #1). Additionally, the target data #1 is linked to the identifier assigned to the first user 720.

It is further assumed that the second user 724 has also previously interacted with the personal computer 704 and has identified a second target image (target image #2). As a result, the data describing this image is also identified as target data (target data #2). This second set of data, however, is linked to the identifier assigned to the second user 724.

FIG. 4 illustrates very generally the operation of the personal computer 704 in response to a generic access instruction, assuming the scenario depicted in FIG. 3. As illustrated in FIG. 3, a user is assumed to log in to the personal computer 704 (step 1002). As a result, that user becomes the "active user". Next, the computer 704 is assumed to execute a generic access instruction (step 1004). In response, the personal computer 704 accesses the target data that is linked to the active user's identifier (step 1006).

Thus, if the first user 720 had logged into the personal computer 704 at step 1002, the personal computer 704 would respond to the generic access instruction by accessing the target data #1. Conversely, if the second user 724 had logged into the personal computer 704 at step 1002, the personal computer 704 would respond to the same generic access instruction in a different manner. That is, the personal computer 704 would access the target data #2.

Lets now consider some of the hardware and software components in each one of the devices depicted in FIG. 1.

Figure 5:
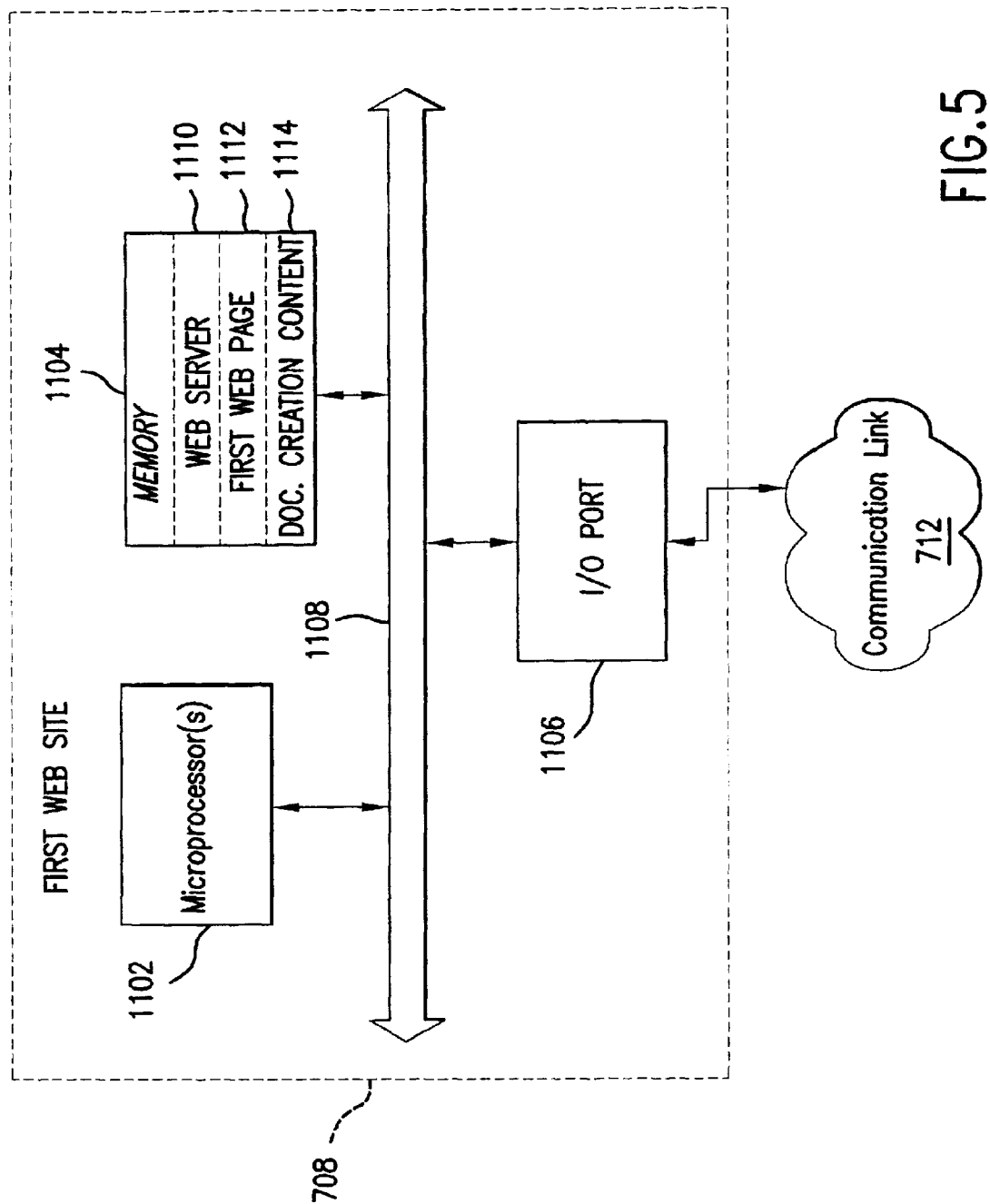
FIG. 5 is a high level block diagram of a first Web site in the client-server system.

FIG. 5 is a high level block diagram of the first Web site 708. As shown, the first Web Site 708 includes a processor 1102, a memory 1104, and an input/output (I/O) port 1106. All these components are connected by one or more local interfaces 1108. The I/O port 1106 links the Web site 708 to the communication link 712. The processor 1102 is used to execute the first Web Server 1110 that is shown stored in the memory 1104.

Also stored in the memory 1104 is a first Web page 1112 and "document creation Web content" 1114. Both the first Web page 1112 and the document creation Web content 1114 are assigned a URL.

As will be described in greater detail below, the document creation Web content 1114 is used to provide a "document creation service" to external devices. Importantly for this discussion, this content includes generic access instructions that are in accordance with the system wide standard. When executed, these instructions result in generic access requests being generated in order to access a set of target data. As mentioned above, generic access instructions are instructions that do not include the location of the target data itself. The "generic access requests" generated from these instructions also do not include the location of the target data.

Figure 6:
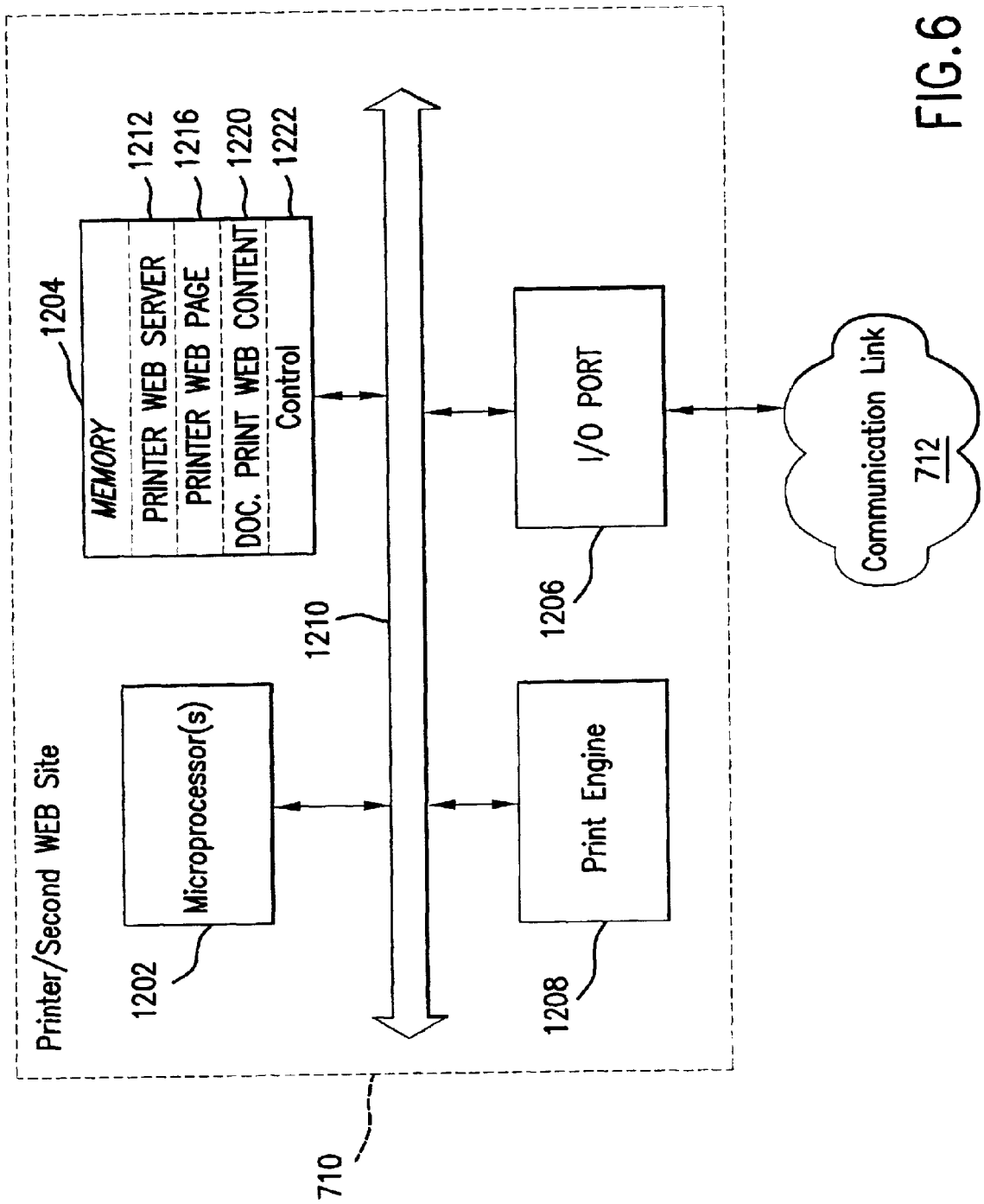
FIG. 6 is a high level block diagram of a printer in the client-server system.

FIG. 6 is a high level block diagram of the printer 710. As shown, the printer 710 includes a processor 1202, a memory 1204, an I/O port 1206, and a print engine 1208. All these components are connected by one or more local interfaces 1210. The I/O port 1206 links the printer 710 to the communication link 712. The print engine 1208 includes the necessary hardware and firmware to print a document.

The processor 1202 is used to execute the print Web Server 1212 and the printer control program 1222 that is shown stored in the memory 1204. Also stored in the memory 1204 is a Web page 1216 and "Document Print Web content" 1220. Both the Web page 1216 and the Document print Web content 1220 are assigned a URL.

As will be described in detail below, the document print content is used to provide a document printing service to external devices. Importantly for this discussion, this content includes generic access instructions that are also in accordance with the system wide standard. When executed, these instructions results in generic access requests being generated.

Figure 7:
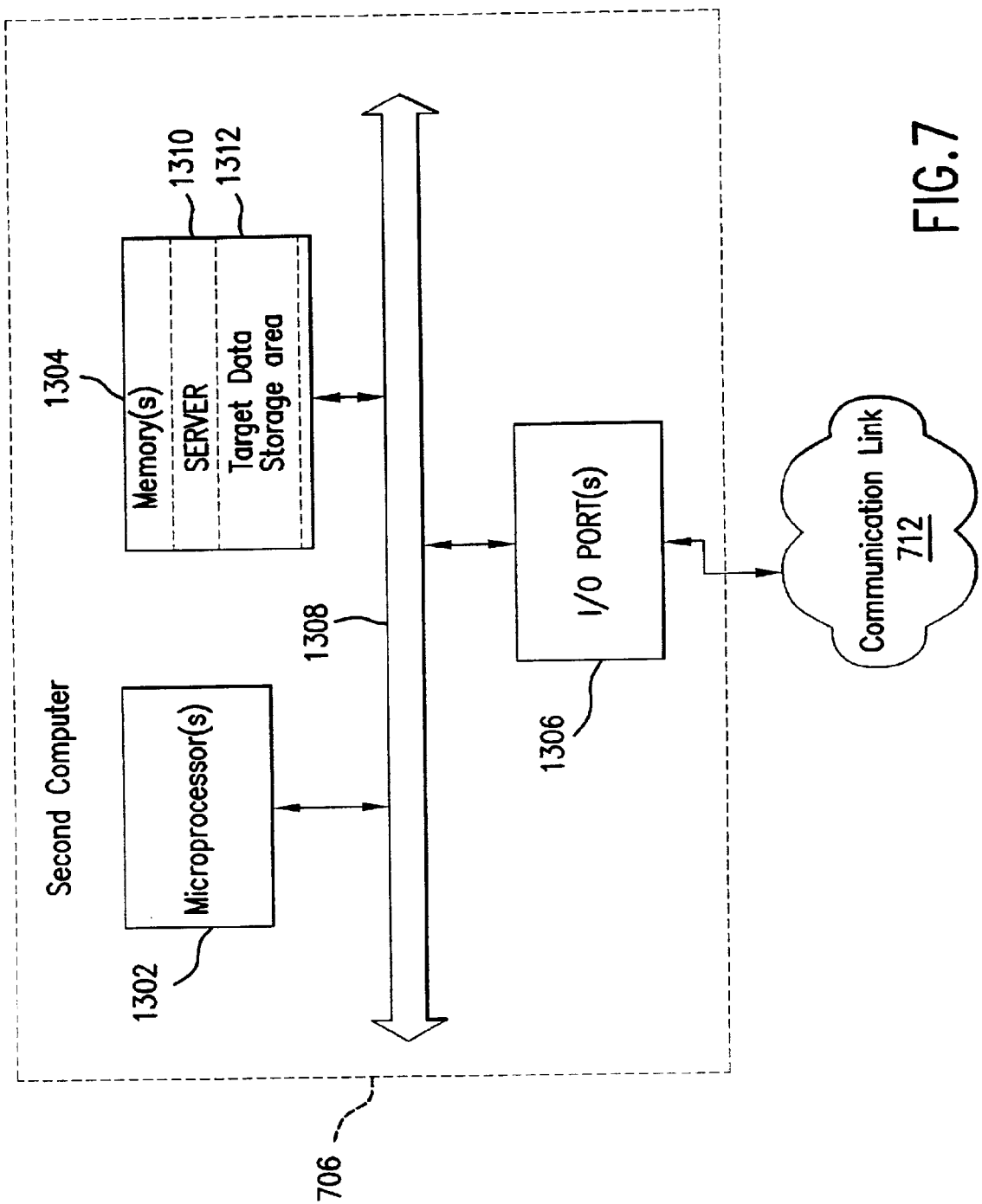
FIG. 7 is a high level block diagram of a second computer in the client-server system.

FIG. 7 is a high level block diagram of the second Computer 706. As shown, the second computer 706 includes a processor 1302, a memory 1304, and an input/output (I/O) port 1306. All these components are connected by one or more local interfaces 1308. The I/O port 1306 links the second computer 1306 to the communication link 712.

The processor 1302 is used to execute the Server 1310 shown stored in the memory 1304. As will be discussed in greater detail below, the memory 1304 includes a reserved storage area 1312 for storing target data that is associated with users of the personal computer 704.

Figure 8:
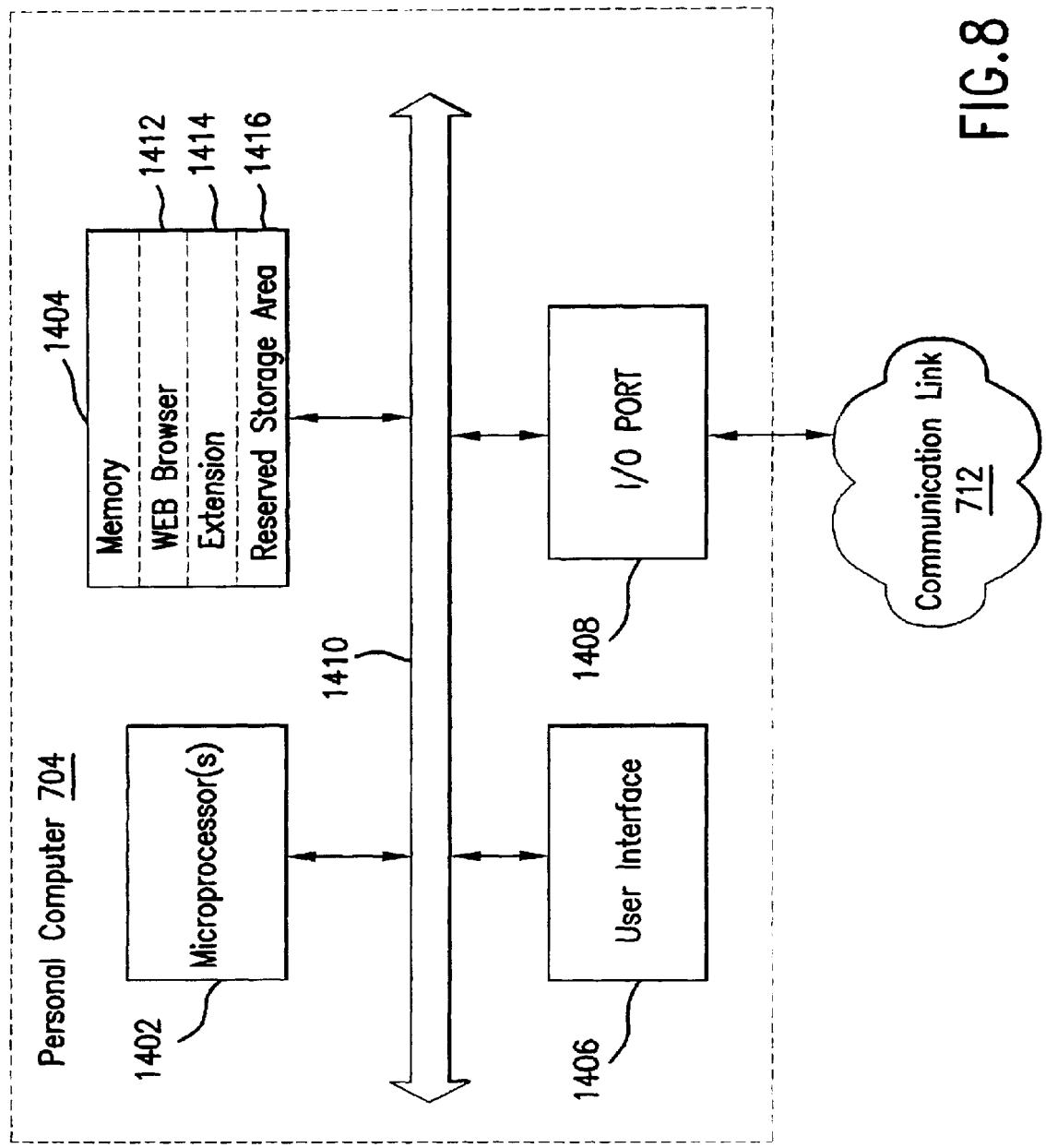
FIG. 8 is a high level diagram of a personal computer in the client-server system.

FIG. 8 is a high level diagram of personal computer 704. As shown, the personal computer 704 includes a processor 1402, a memory 1404 and an input/output (I/O) port 1408. All these components are connected by one or more local interfaces 1410. The I/O port 1408 links the second computer 706 to the communication link 712.

As shown, the memory 1404 includes a reserved storage area 1416 and a Web Browser 1412. The Web Browser 1412 includes an extension component (extension) 1414. The processor 1402 is used to execute the Web Browser 1412.

Importantly, the extension 1414 is configured to respond to generic access requests (generated by downloaded Web Content) by accessing the set of target data that is linked to the current active user. It will be clear to a person skilled in the art that the extension 1414 may be an application programming interface (API) and the generic access requests can be API function calls. It is important to note, however, that the there are other ways to implement the functionality provided by the extension 1414. The present invention is not limited to any one way.

It is also noted that in each of the computers just described, the memory shown may include both volatile and nonvolatile components. Volatile components are those that do not retain data upon loss of power. Non-volatile components are those that retain data upon a loss of power.

Thus, each of the memories shown in FIGS. 1–8 may comprise, for example, random access memory (RAM), read-only memory (ROM), hard disk drives, floppy disks accessed via an associated floppy disk drive, compact disk (s) accessed via a compact disk drive, magnet tape(s) accessed via an appropriate tape drive, and/or other memory components (currently known in the art, or yet to be developed), or a combination of any two or more memory components.

In addition, it is also noted that in each of the devices just described, the processor shown may include one or more than one microprocessors. Furthermore, the local interface in each device may include, for example, one or more data buses and accompanying control buses.

Figure 9:
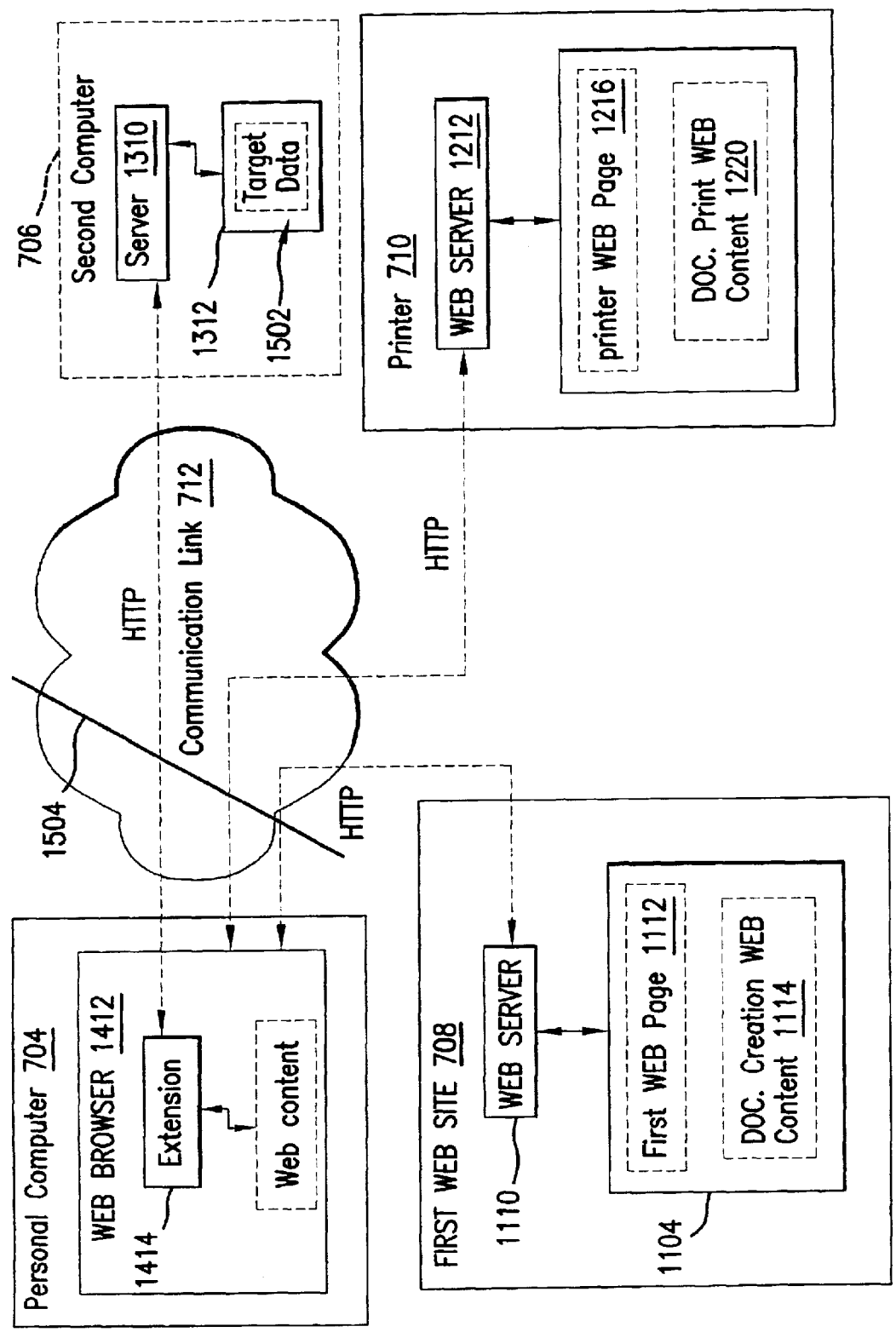
FIG. 9 illustrates how the various software components in the client server system can communicate.

FIG. 9 illustrates how the various software components can communicate over the communication link 712. To illustrate an aspect of the invention, it will be assumed that the personal computer 704 must communicate to the other devices shown through a conventional firewall 1504. The firewall 1504 is used to filter out unwanted communication packets in a conventional manner. Thus, requests may be made by the personal computer 704 to external devices located on the other side of the firewall 1504 and responses to these requests from the external devices are typically allowed. Communications, however, initiated by these external devices to the personal computer 704 are not permitted.

The firewall 1504, however, includes a conventional proxy server (hereafter "firewall proxy") that allows the personal computer 704 to pass HTTP requests to the Web server 1110, the Server 1310 and the Web server 1212. As will be seen, by using the HTTP protocol to traverse the firewall 1504 in this manner, the personal computer 704 is able to make use of the services provided by the first Web site 708 and the printer 710. In addition, the personal computer 704 is able to store target data in the memory 1304 located in the second computer 706. It is important to note that in other embodiments of the invention other communication protocols (either now existing or yet to be developed) can be used.

In response to user input, the Web browser 1412 can request the first Web page 1112 as well as the Document creation Web content 1114 by transmitting appropriate HTTP requests (via the proxy) to the Web server 1110. Similarly, the Web browser 1412, can request the printer Web page 1216 as well as the document print Web content 1220 received from the Web server 1212. The Web browser 1412 can also communicate one or more sets of data (via the proxy) to the server 1310 and can retrieve this data.

Figure 10:
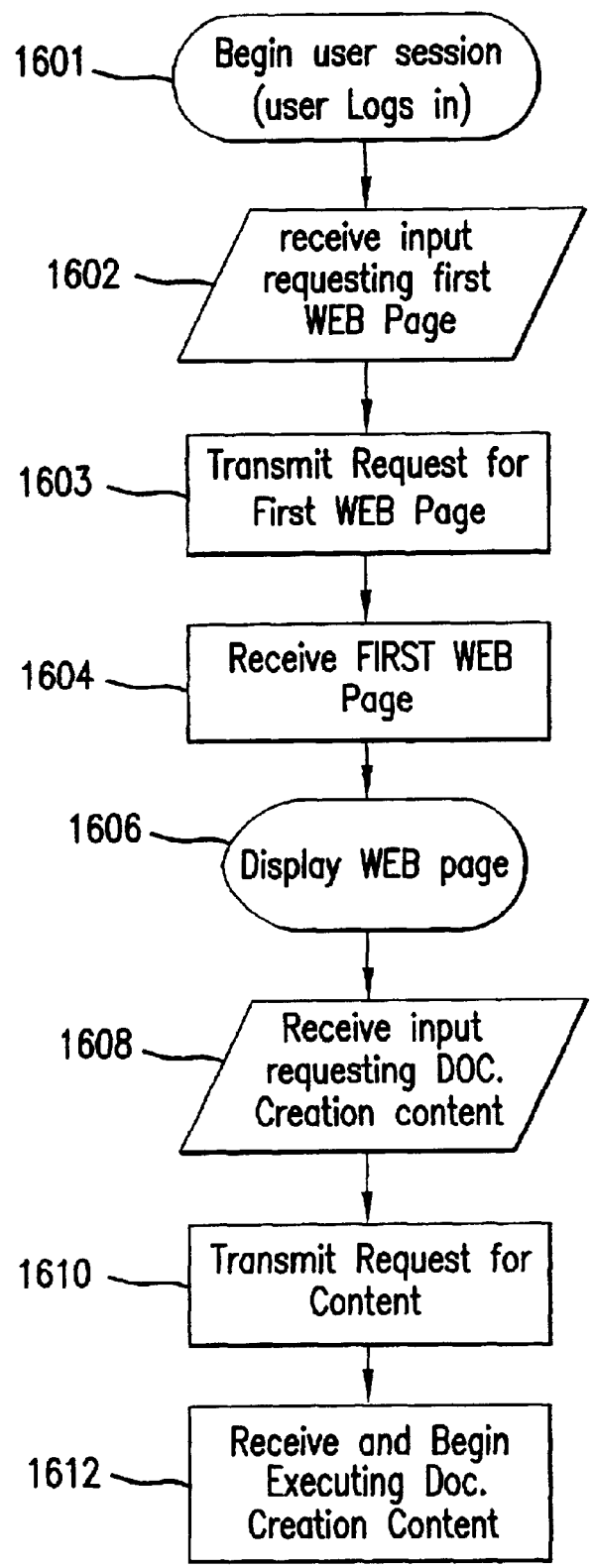
FIG. 10 is a flow diagram illustrating how the personal computer can download first Web content that allows a user to create a document.
Figure 11:
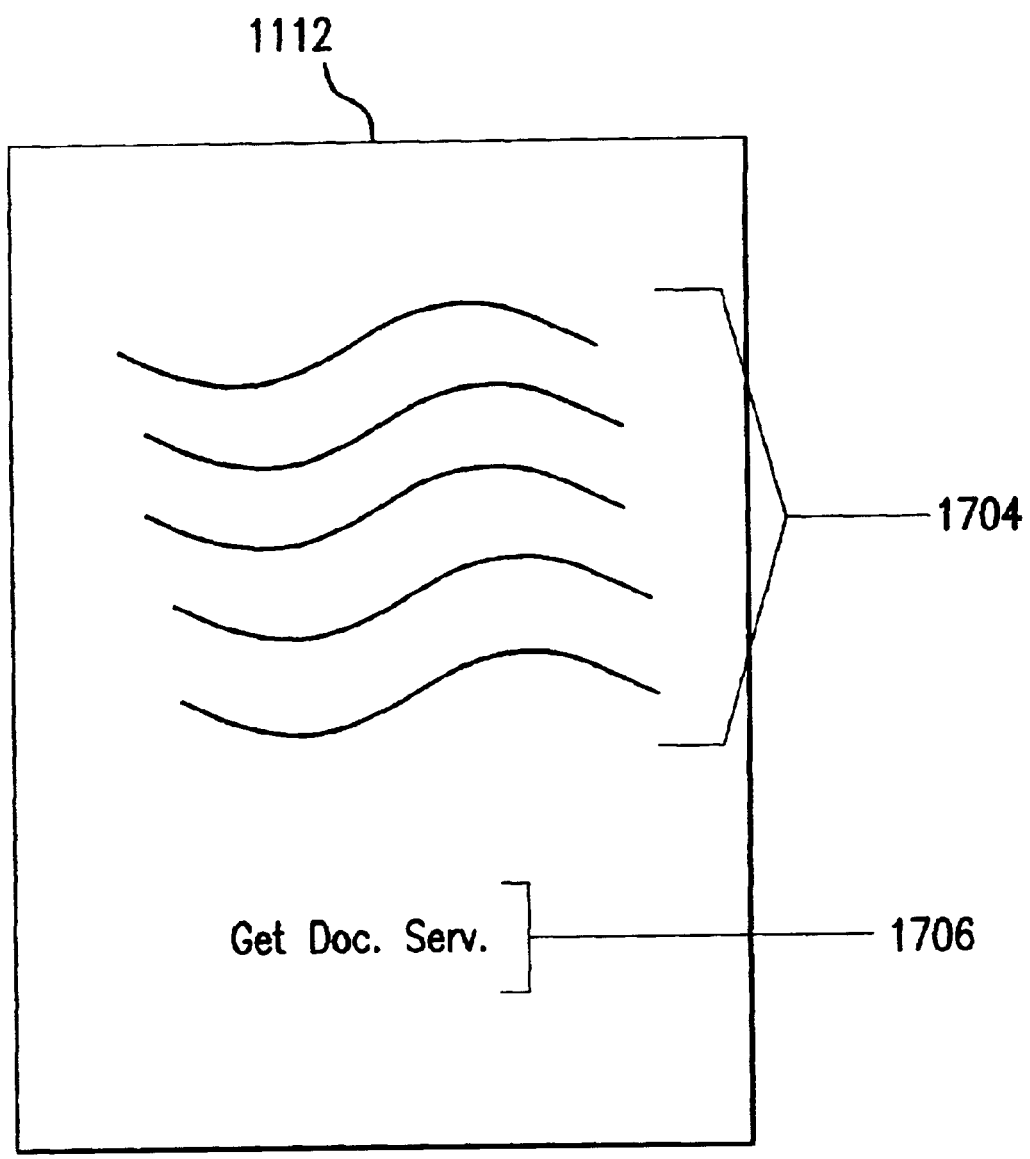
FIG. 11 illustrates a first Web Page that includes a hyperlink to the first Web content.
Figure 12:
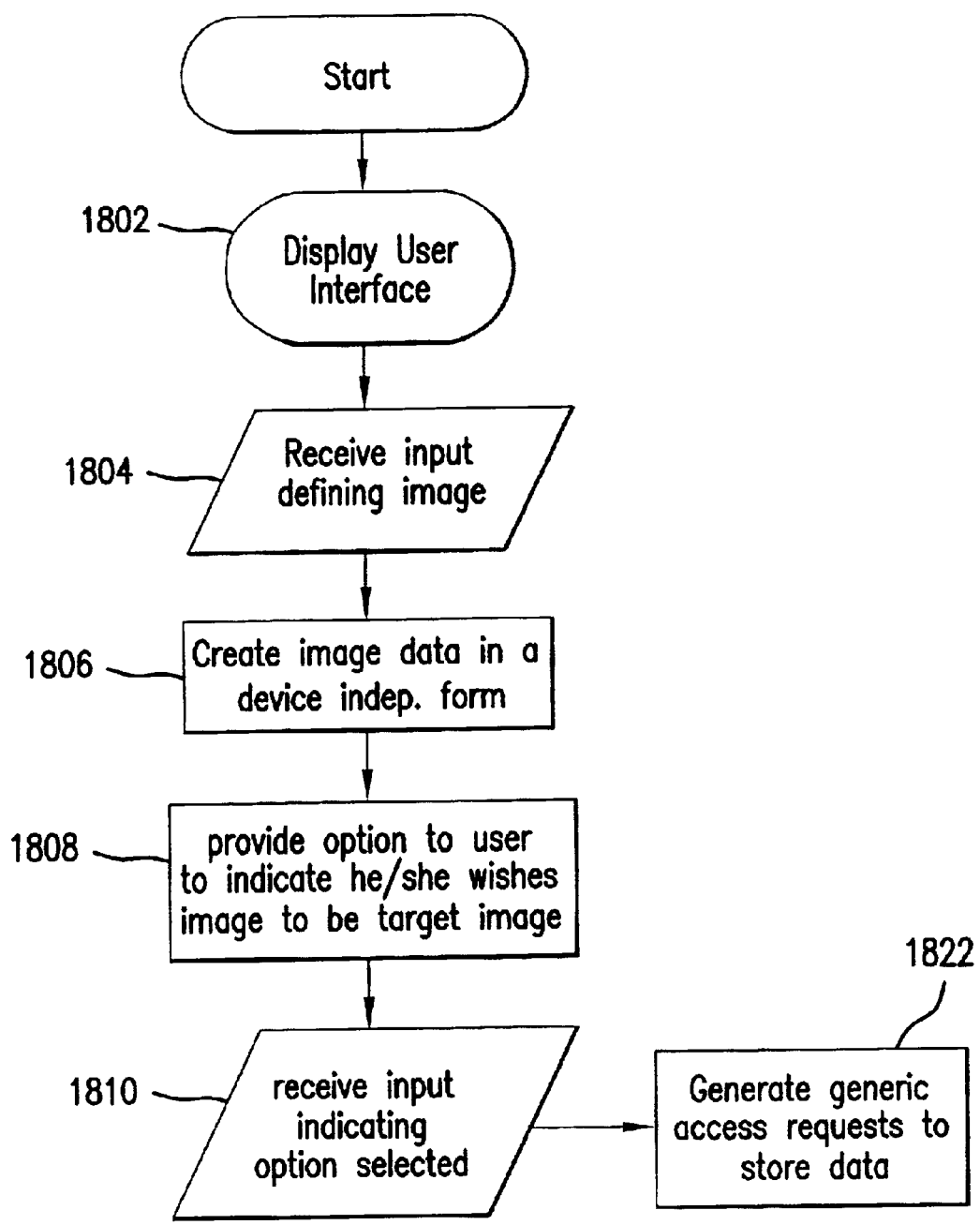
FIG. 12 is a flow diagram illustrating the execution of the first Web content.

FIG. 10–12 are used to illustrate how a user of the personal computer 704 can make use of the document creation service provided by the first Web site 708.

Referring first to FIG. 10, a user logs into the personal computer 704 and begins a user session (step 1601). In this manner, the user becomes an active user.

Next, the user inputs an appropriate URL for the First Web page 1112. The Web Browser 1412 receives this input at step 1602 and in response transmits (via the firewall proxy) an appropriate request for the page to the Web server 1110 (step 1603).

The Web server 1110 receives the request and responds by transmitting the first Web page 1112 to the Web Browser 1412 (via the firewall proxy).

The Web Browser 1412 receives this response from the Web server 1110 at step 1604 and displays the received first Web page 1112 at step 1606.

FIG. 11 illustrates the first Web page 1112 as displayed by the browser 1412. Referring briefly to FIG. 11, the first Web Page 1112 includes a text portion 1704 and a "get document service" hyperlink 1706. The text portion 1704 may include information regarding the document creation service provided by the first Web Site 708. The hyperlink 1706 is formatted such that, when selected by a user, the Web Browser 1412 transmits an appropriate request to the Web server 1110 for the Document Creation Web content 1114. In other embodiments, the first Web Page 1112 may also display a cost to use the service as well as provide a means for the user to enter payment information (e.g., credit card information) to pay for the service.

Referring again to FIG. 10, it is assumed the user selects the get document service hyperlink 1706 and the browser 1412 receives this input at step 1608. In response to this input, the browser 1412 transmits an appropriate request to the Web Sever 1110 (via the firewall proxy) for the Document creation Web content 1114 (step 1610). The browser 1412 receives and begins executing the Web content 1114 at step 1612.

FIG. 12 illustrates the operation of the Document creation Web content 1114 while being executed at step 1612. Referring now to FIG. 12, the content 1114 causes the display device 716 to display a user interface (step 1802). The user interface accepts input from a user (via the input devices 714) so as to allow the user to define an image.

The Web content 1114 receives these inputs at step 1804 and creates a set of data describing the image (step 1806). In this example, the data is created in a file format that is device independent. That is to say, the data represents the image in a manner that is independent of the Web content, the local operating system and hardware used to generate it. One example of such a format is the format known as "PDF" (Portable Document Format).

Next, the Web content 1114 provides a means for the user to indicate whether he/she wishes the image defined at step 1804 to be saved as a "target image" (step 1808). For example, the user interface displayed at step 1802 may include one or more selectable options or a pull down menu for providing a user a means to indicate this desire.

The Web content 1114 is assumed to receive this indication at step 1810. In response to this input, the Web content 1114 generates generic access requests in order to cause the data generated at step 1806 to be stored (step 1822). The Extension 1414 is responsible for responding to these requests.

Figure 13:
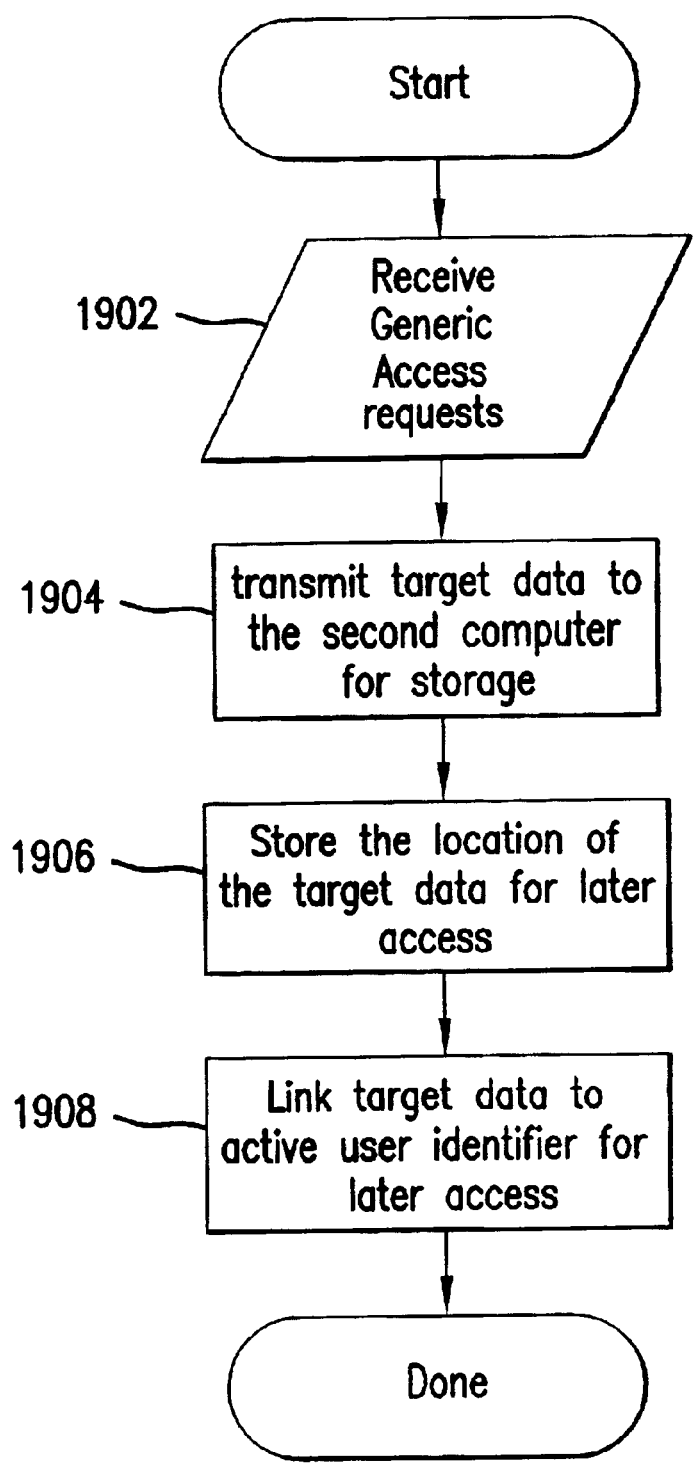
FIG. 13 is a flow diagram illustrating the operation of an extension component in the personal computer.

FIG. 13 is a flow diagram for illustrating the operation of the extension 1414 to respond to the generic access requests generated at step 1822. Referring now to FIG. 13, the extension 1414 receives the generic access requests at step 1902. In response, the extension 1414 causes the target data created at step 1806 to be stored in the reserved storage area 1312 of the second computer 706 (step 1904). This is accomplished by the extension 1414 communicating the target data over the communication link 712 to the server 1310. It is noted that because the HTTP protocol is used, the extension 1414 is able to communicate the target data through the firewall 1504.

The server 1310 responds by storing the target data in the reserved storage area 1312. It will be assumed that the first target data 1502 represents this target data.

In addition to communicating the target data 1502 to the server 1310, the extension 1414 (preferably) also stores the location of the first target data 1502 so that the data can later be accessed (step 1906) and links this location to the active user's identifier (step 1908).

FIGS. 14–22 are used to illustrate how a user of the personal computer 704 can make use of the printing service provided by the printer 710. In this section, it will be assumed that the conditions depicted in FIG. 14 exist.

Figure 14:
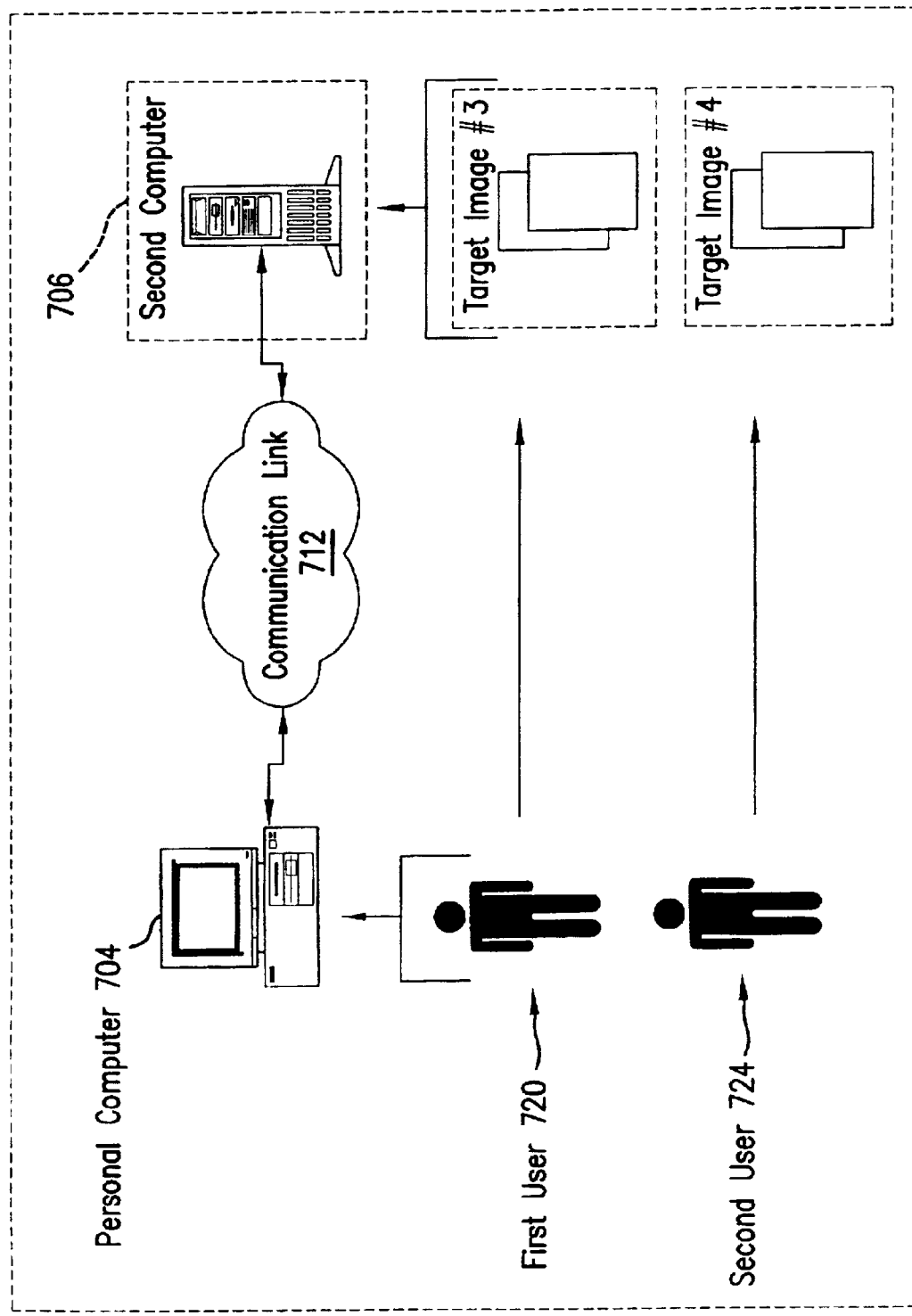
FIG. 14 is used to illustrate, in abstract form, a set of conditions.

As indicated in FIG. 14, the first user 720 has made use of the document creation service to identify a target image (target image #3). The data (target data #3) that describes this image is stored in the internal memory of the second computer 706. Furthermore, the second user 724 has also made use of the document creation service to define a target image (target image #4). The data (target data #4) that describes this second image that is also stored in the internal memory of the second computer 706.

Figure 15:
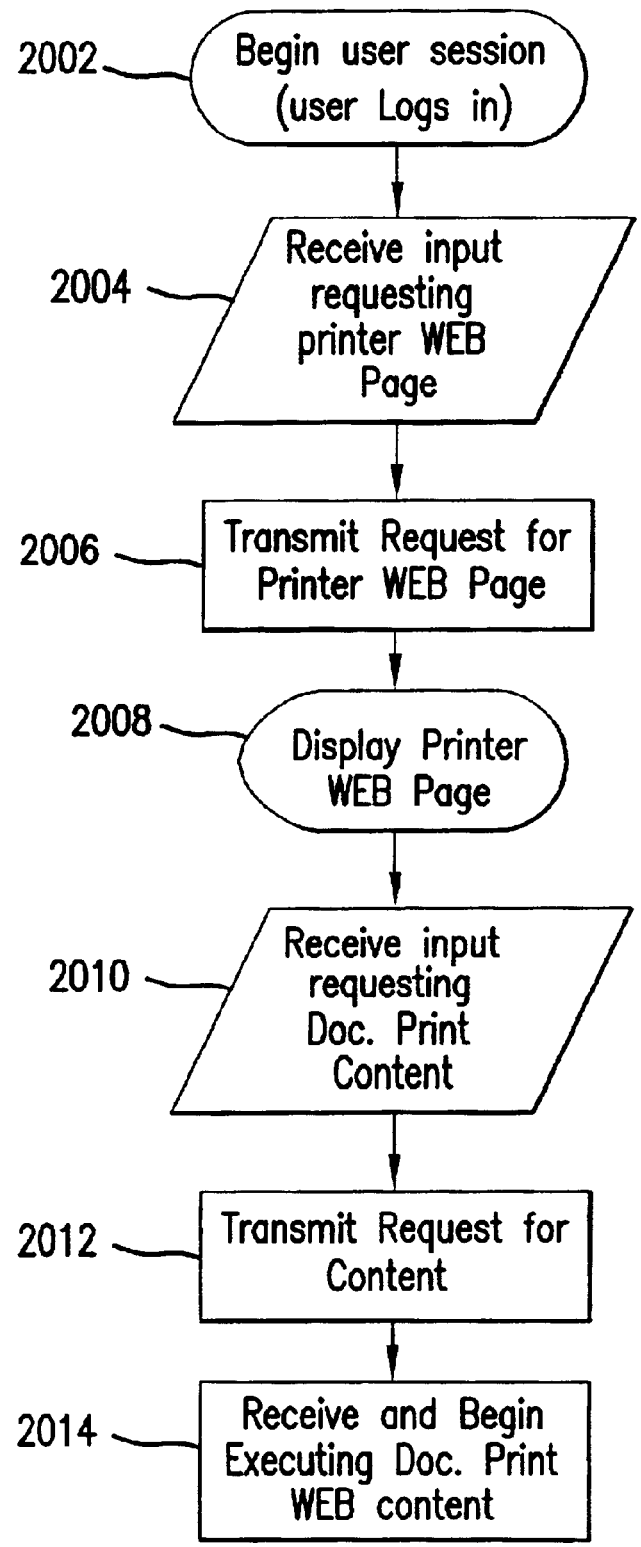
FIG. 15 is a flow diagram illustrating how the personal computer can download second Web content that allows a user to print a document.

Referring now to FIG. 15, one of the two users logs into the personal computer 704 (step 2002) and executes the Web browser 1412. The user is then assumed to provide the URL of the printer Web page 1216. The Web browser 18 receives this input at step 2004.

In response to this input, the Browser 1412 transmits an appropriate request to the Web Server 1212 for the Printer Web page 1216.

The Web server 1212 receives this input and responds by transmitting the printer Web page 1216 to the Web Browser 1412.

The Web Browser 1412 receives and displays the printer Web page 1216 at step 2008.

Figure 16:
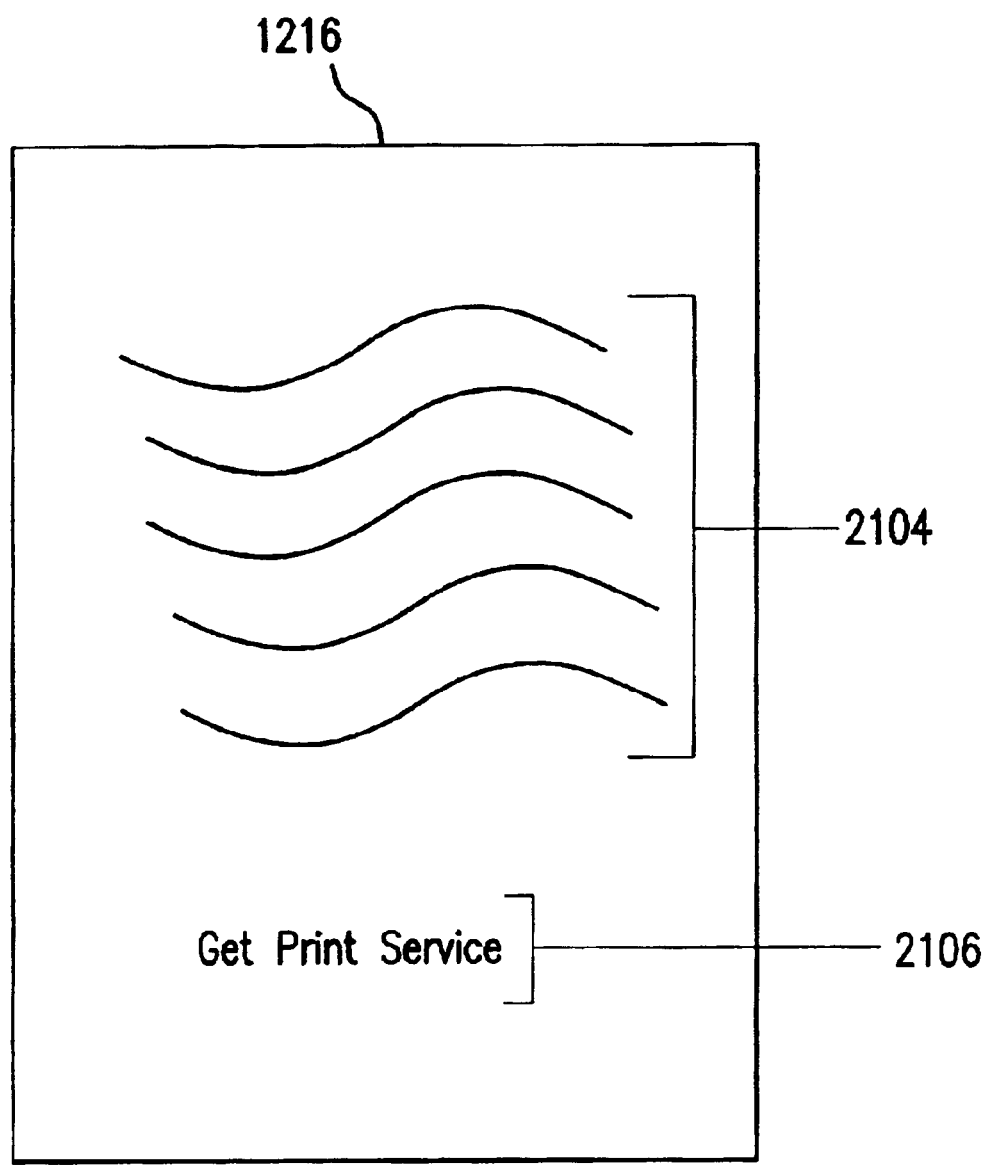
FIG. 16 illustrates a second Web Page that includes a hyperlink that to the second Web content.

FIG. 16 illustrates the printer Web page 1216 as displayed by a browser. Referring briefly to FIG. 16, the printer Web page 1216 includes a text portion 2104 and a "get document print service" hyperlink 2106. The text portion 2104 may include information regarding the document printing service provided by the printer 710. The hyperlink 2106 is formatted such that, when selected by a user, the Web Browser 1412 transmits an appropriate request to the Web server 1212 for the Document print Web content 1220. In other embodiments, the printer Web page 1216 may also display a cost to use the printing service and may provide the user with a means to enter payment information to make use of the service.

Referring again to FIG. 15, it is assumed that the user selects the get print service hyperlink. The Web Browser 1412 receives this input at step 2010 and in response transmits a request for the Web content 1220 to the Web server 1212.

The Web server 1212 receives this input and responds by transmitting the Document Print Web content 1220 to the Web browser 1412.

The Web Browser 1412 receives the print Web content 1220 and begins executing it at step 2014.

Figure 17:
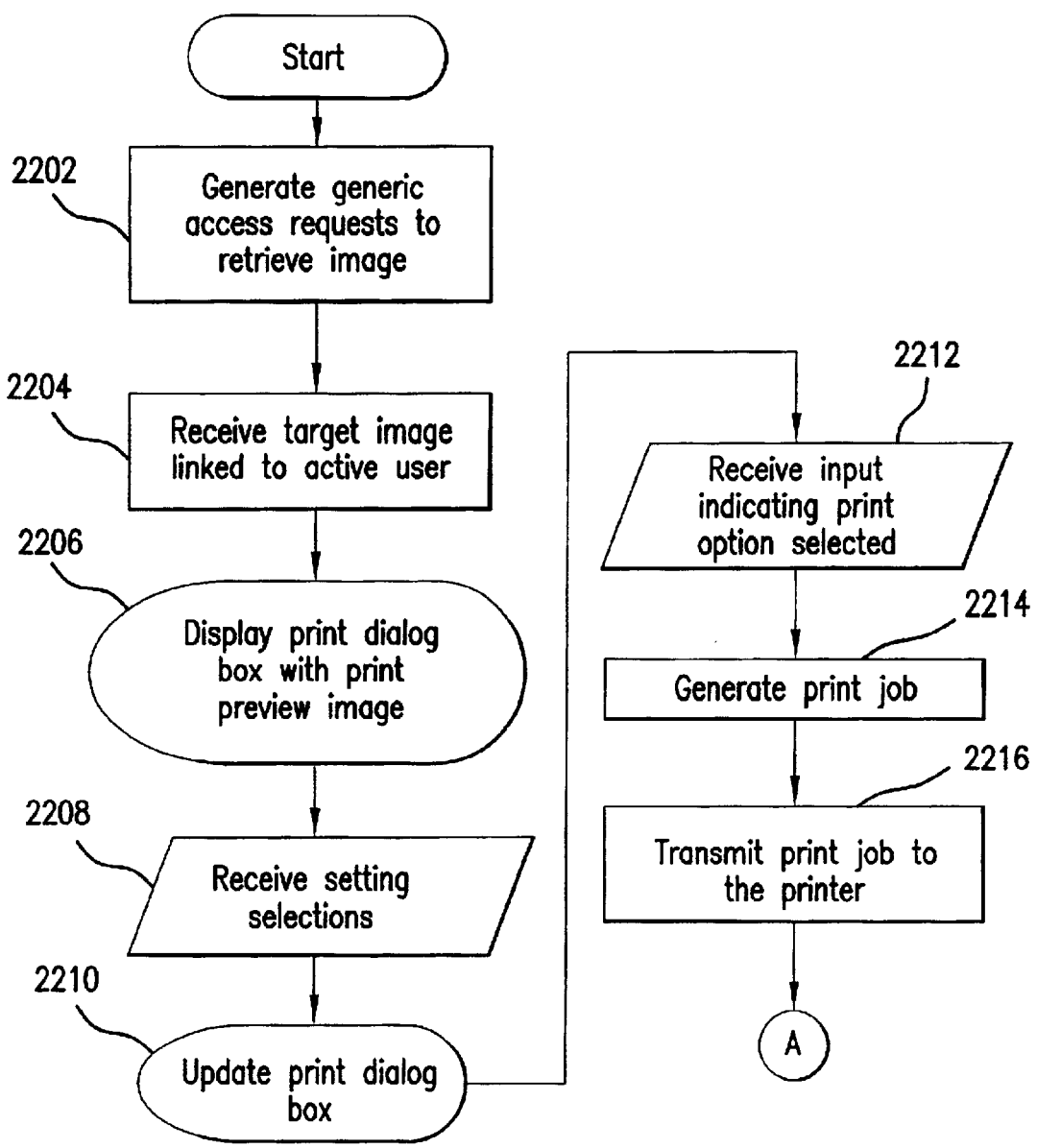
FIG. 17 illustrates the execution of the second Web content.
Figure 18:
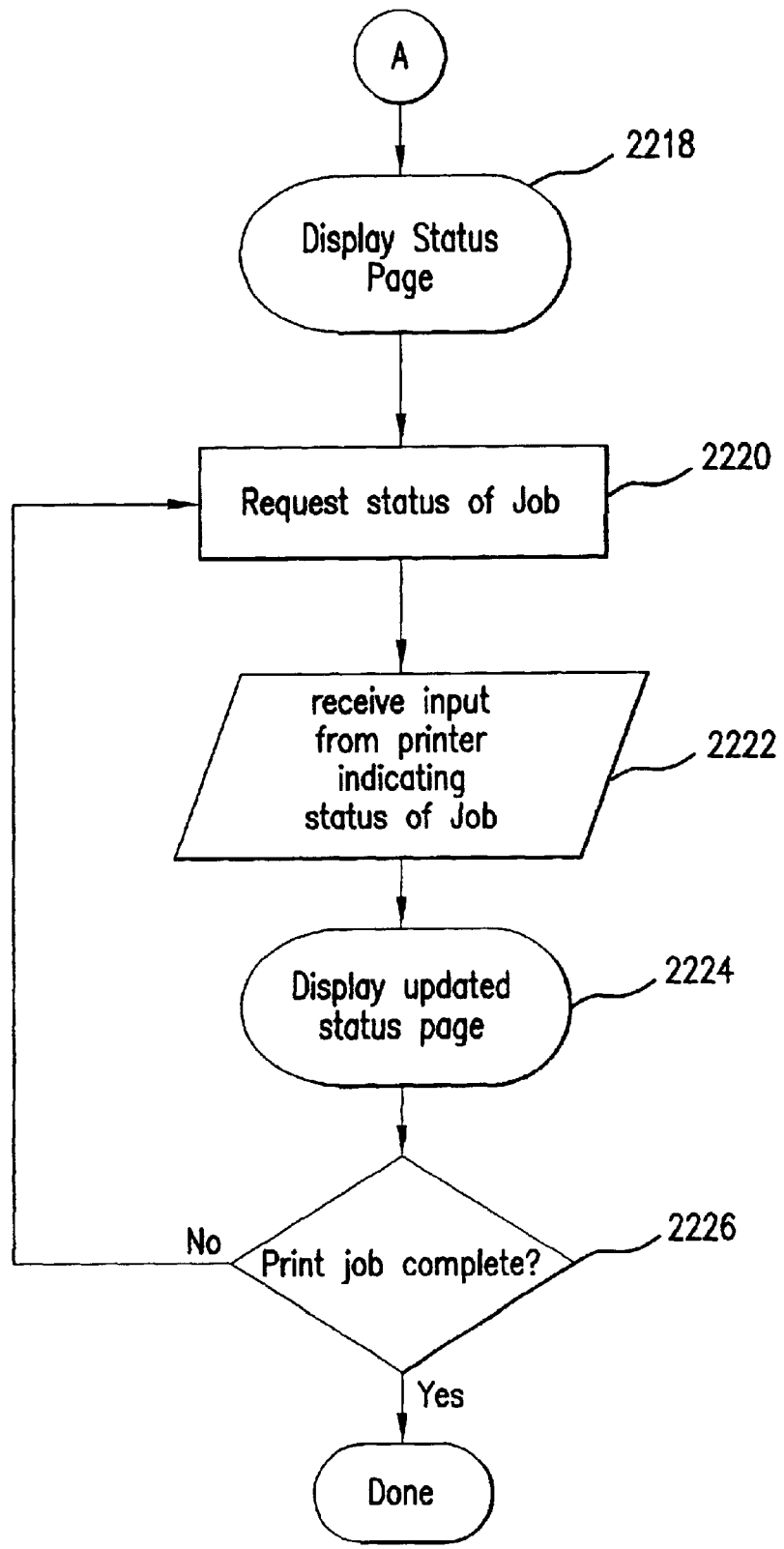
FIG. 18 illustrates an operation of a Web content from a target web service.

FIGS. 17 and 18 illustrate the operation of the print Web content 1220 (while being executed at step 2014). First, print Web content 1220 causes generic access requests to be generated in order to retrieve a target image (step 2202).

Figure 19:
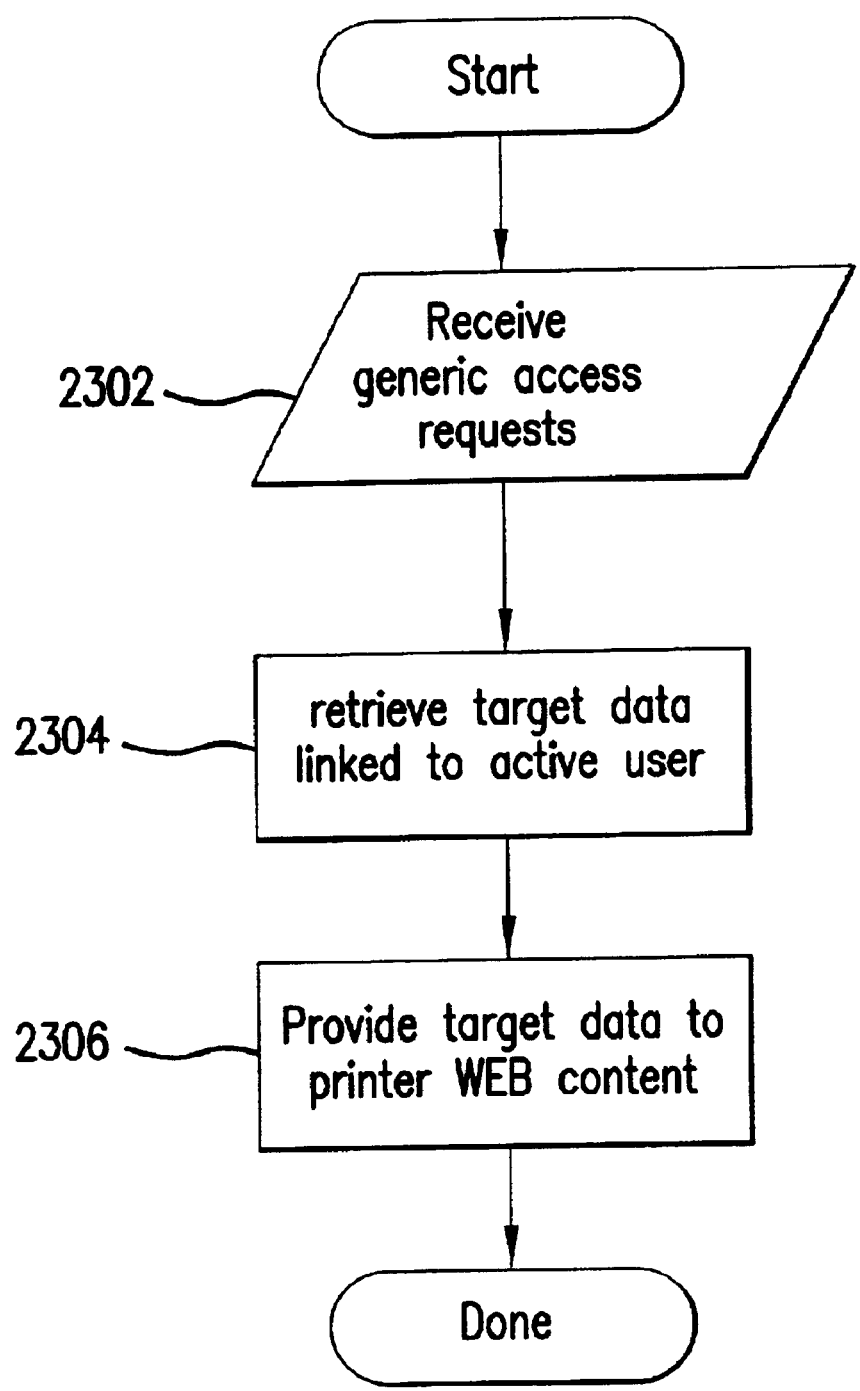
FIG. 19 illustrates further the operation of the extension component in the personal computer.

FIG. 19 illustrates the operation of the extension 1414 to respond to the generic access requests generated at step 2202. Referring briefly now to FIG. 19, the extension 1414 receives these generic access requests at step 2302. In response, the extension 1414 retrieves the set of target data that is linked to the active user (step 2304). (It is noted that in other embodiments, generic access requests may define a format for the retrieved data. This desired format is then communicated to the server and the server provides the target data in the desired format. Importantly, the desired format may be different than the originally stored format. Thus, for example, the set of target data may be stored as a PDF format and returned, for example, in a JPEG format. This may be advantageous in situations wherein a second form of the target data is better suited for printing, displaying, etc)

It can be seen that, for example, if the first user 720 is presently logged into the personal computer 704, the extension 1414 responds by retrieving target data #3 (stored in the second computer 706). This is accomplished by transmitting appropriate HTTP requests for this data to the server 1310. The server 1310 responds by transmitting this data to the extension 1414. Conversely, if the second user 724 is presently logged into the personal computer 704, the extension 1414 responds by retrieving the set of target data #3.

The extension 1414 then operates to provide the retrieved target data to the Document Print Web Content 1220 in an appropriate manner (step 2306).

Referring again to FIG. 18, the Web content 1220 receives the retrieved target data (from the extension 1414) at step 2204. In response, the Web content 1220 causes the personal computer 704 to display a print dialog box with a print preview image (step 2206).

Figure 20:
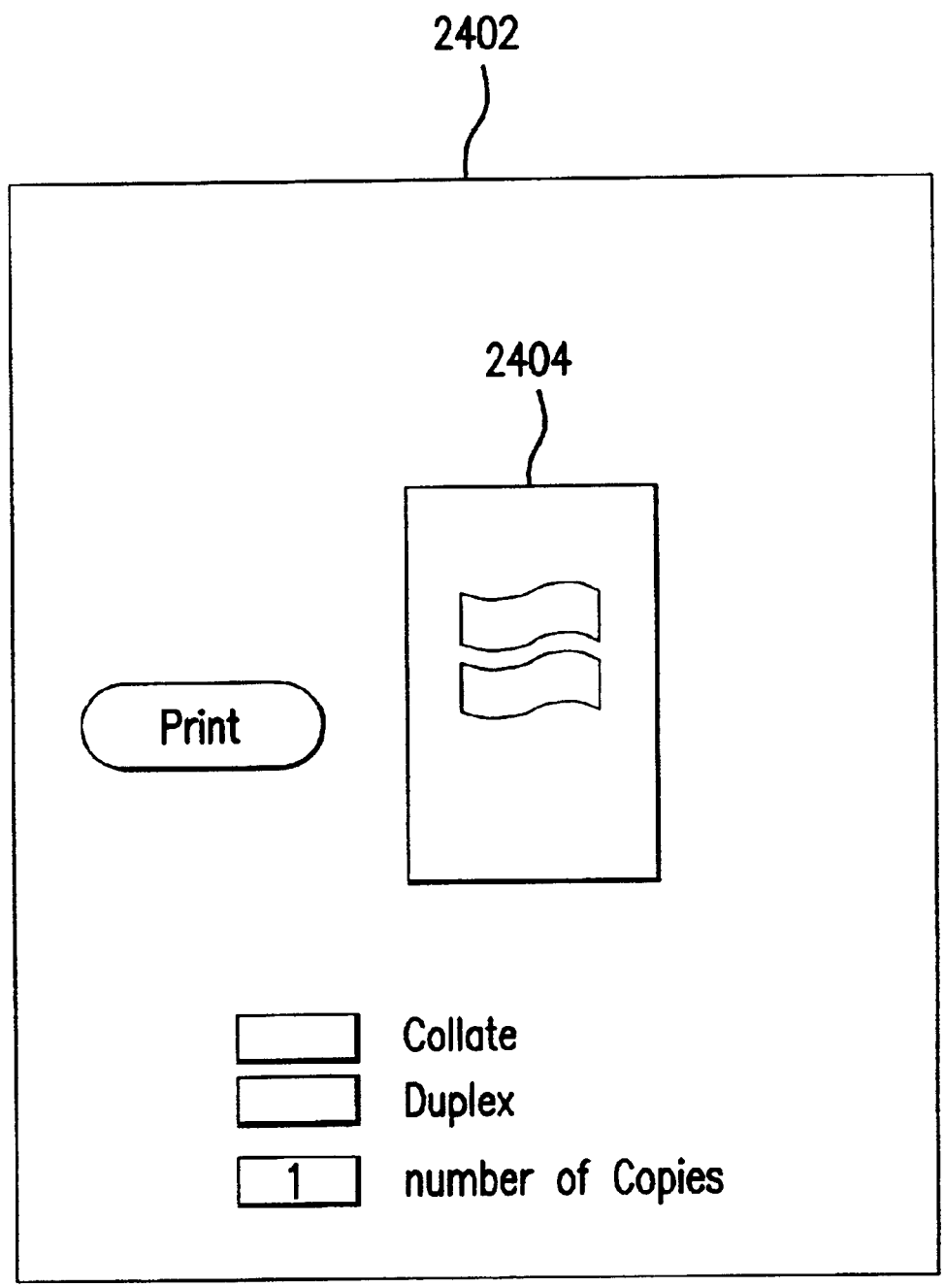
FIG. 20 illustrates an exemplary print dialog box.

FIG. 20 illustrates an exemplary print dialog box 2402 that may be displayed by the personal computer 704 at step 2206. As shown, the dialog box 2402 displays a print preview image 2404 that allows the user to define particular print settings. In this example, the print dialog box 2402 allows the user to enter the number of copies, select a duplex option and/or a collate option.

Importantly, these options are based upon the capabilities of the printer 710. The print preview image that is displayed is based, in part, upon the retrieved target image (i.e., the target image #3 or the target image #4) as well as the options selected.

Referring again to FIG. 17, the Web content 1220 is assumed to receive the user input indicating that certain settings have been selected at step 2208 and updates the dialog box 2206 accordingly.

Figure 21:
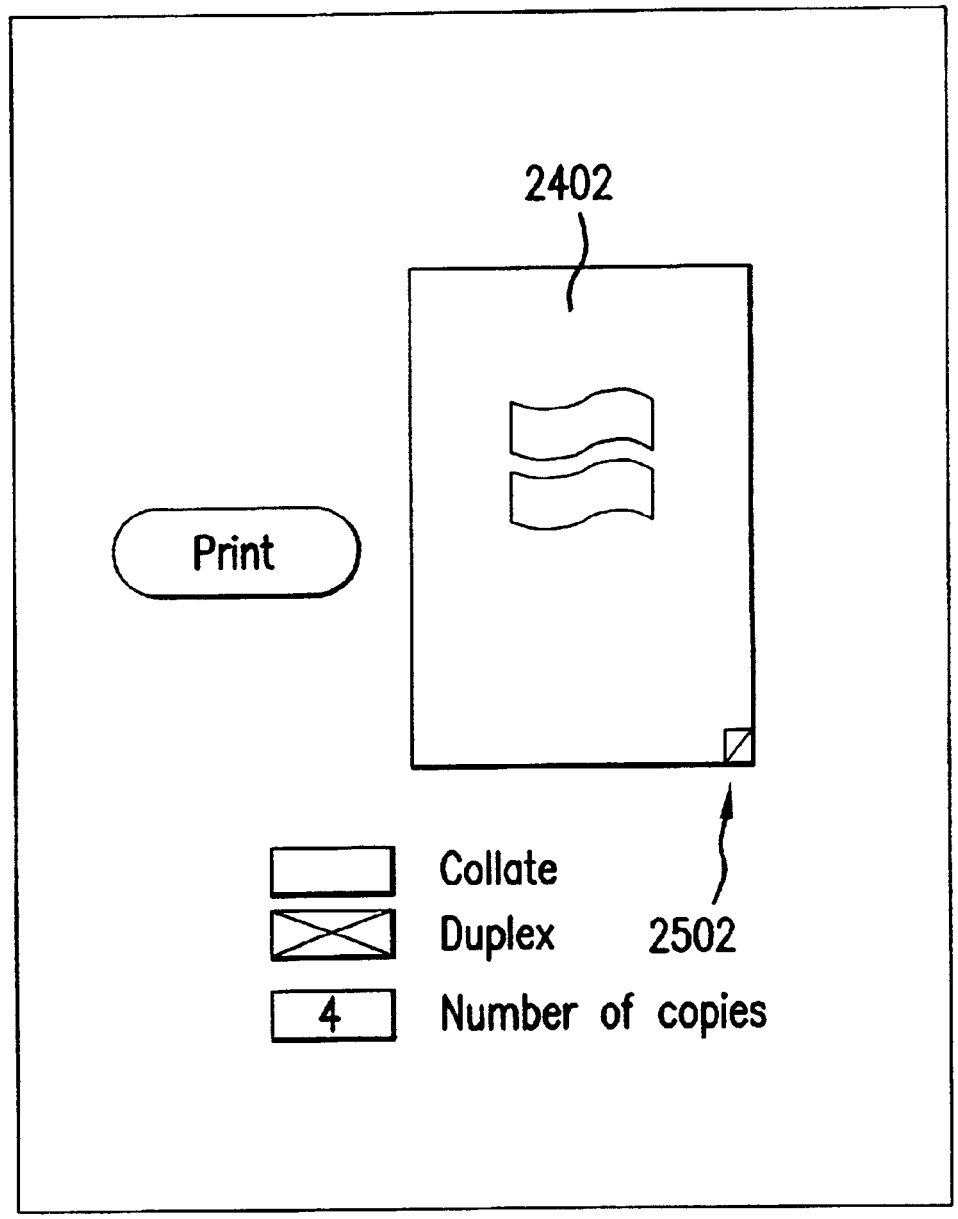
FIG. 21 illustrates the print dialog box after being updated.

FIG. 21 illustrates how the print dialog box 2402 would be updated assuming that the user has selected the duplex option and has entered "4" as the number of copies he/she wishes printed. It is noted that the print pre-view image reflects the duplex option by an icon 2502.

Referring once again to FIG. 17, it is assumed that Web content 1220 receives input indicating the user has selected the print button 2410. The Web content 1220 responds to this input by generating a print job and by transmitting the print job to the Web server 1212 (steps 2214 and 2216). The print job includes the target data and also includes commands that cause the printer 710 to print the image according to the inputted settings.

The Web server 1212 receives the print job and provides the print job to the printer control program 1222. The printer control program 1222 commands the print engine 1208 to print the target image according to the settings described by the print job.

After the print job is transmitted to the printer, the Web content 1220 displays a "print status page" that shows the status of the print job in a dynamic fashion (step 2218). This is accomplished by the Web content 1220 obtaining certain status information from the printer 710 regarding the printing of the print job (step 2220).

It is noted that the step 2220 may be accomplished by using a number of techniques. For example, PML (Peripheral Management Language) polling may be used. Optionally, the techniques taught in the pending application entitled "Method and Apparatus for Providing Print Job Status, may be used. That application is assigned the Ser. No. 09/702,766 and was filed Nov. 1, 2000. That application is incorporated herein entirely by reference.

As the status information is received (step 2222) back from the printer 710, the Web content 1220 updates the status page so as to reflect the updated information (step 2224). This process continues until the print job is completed (step 2226).

Figure 22:
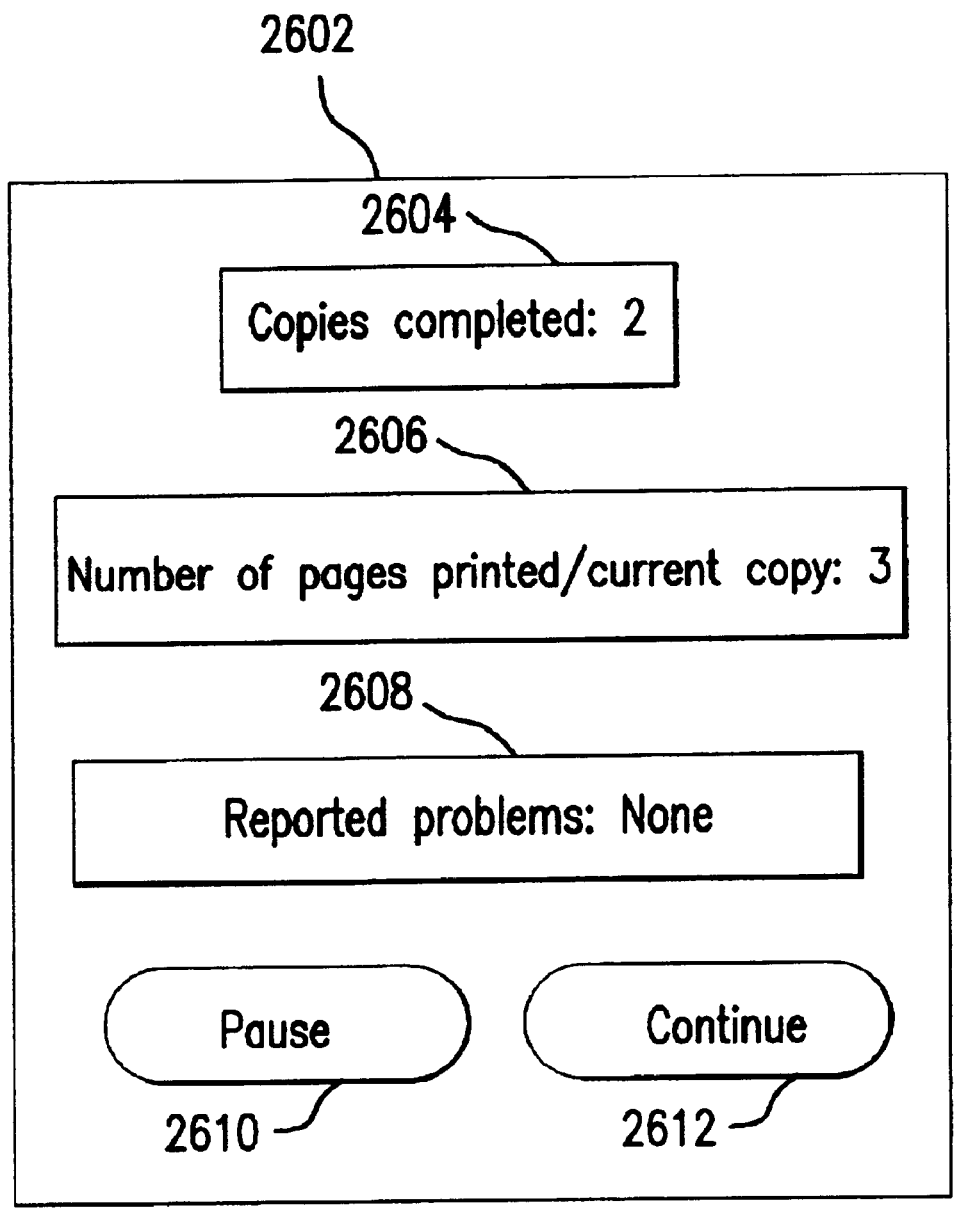
FIG. 22 provides an example of a status page.

FIG. 22 provides an example of a status page 2602 that may be displayed at step 2218. As shown, the status page 2602 includes a first field 2604, a second field 2606 and a third field 2608. The first field 2604 displays the number of copies that has been printed. The second field 2604 displays the number of pages printed for the copy that is presently being printed.

The third field 2608 describes certain problems with the current print job encountered during printing. For example, if the printer 710 reports that a paper jam has occurred, this information can be displayed in this third field.

Additionally, the status page 2602 includes a pause button 2610 and a continue button 2612. If the pause button 2610 is selected, the Web content 1220 sends an appropriate message to the Web server 1212 indicating that the printing of the present job should be paused.

The Web server 1212 receives this message and communicates it to the printer control program 1222. The control program 1222 responds by pausing the printing of the present print job.

After the pause button 2610 has been selected and the printing of the present print job has been paused, a user can then select the continue button 2612. When the continue button is selected, the Doc. Print Web content 1220 sends an appropriate message to the Web server 1212 indicating printing should be resumed.

The Web server 710 receives this message and communicates it to the printer control program 1222. The control program 1222 responds by causing the printing of the present print job to resume.

Figure 23:
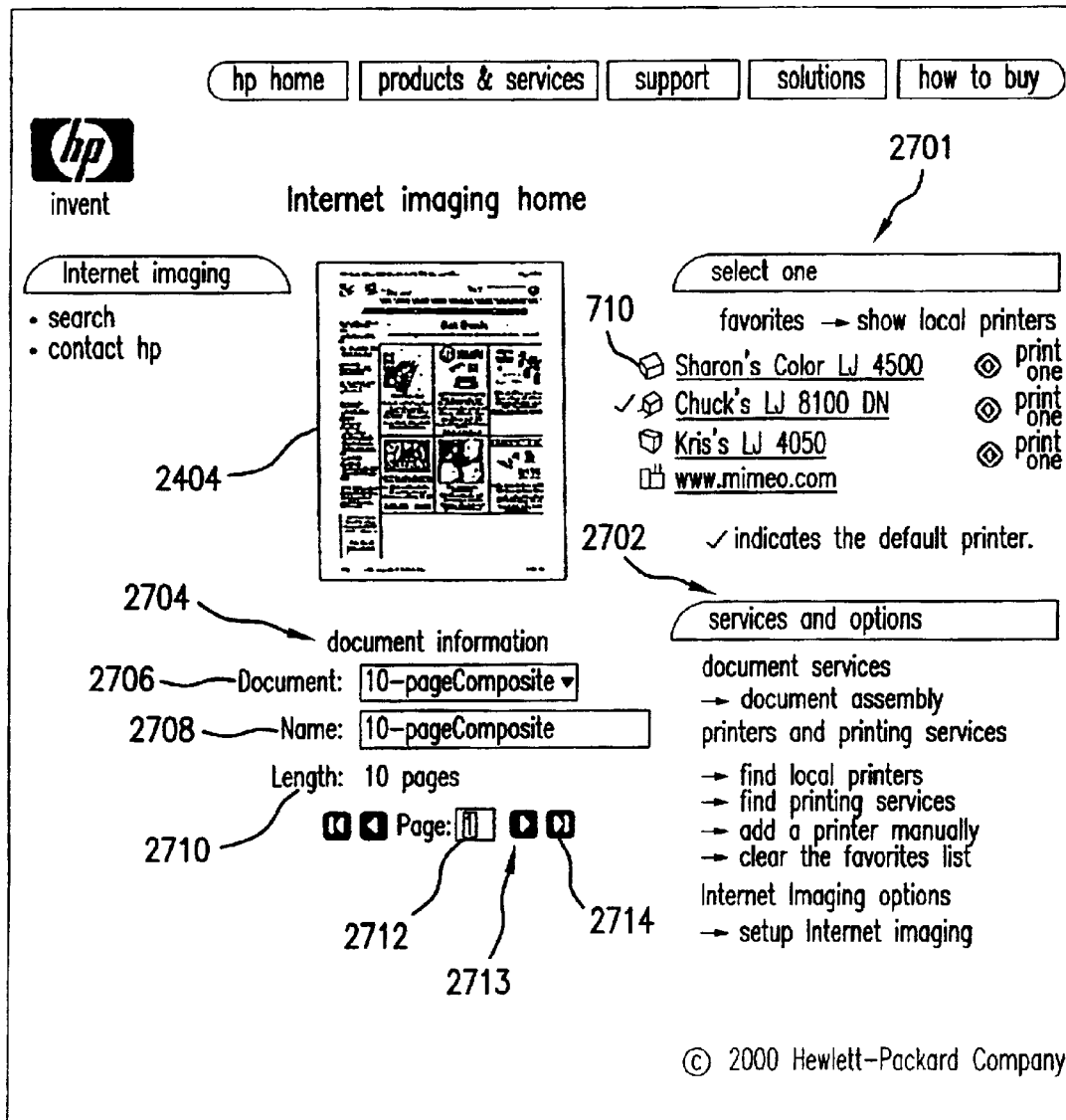
FIG. 23 illustrates a more detailed view of the Web imaging home page.

With respect to FIG. 23, there is illustrated a more detailed example of an Internet imaging home page or print dialog box 2402 that is displayed by a personal computer 704 (FIG. 7) and is responsible for helping the user locate various other Web-based imaging devices and services, such as printer 710 (FIG. 7) and services and options section 2702. As shown, home page 2402 displays a print preview image 2404 that allows the user to preview the print image.

Also, document information section 2704 is illustrated. Section 2704 includes, but is not limited to, document selector menu (2706), document name (2708), document length (2710), and a document page shuttle controls (2713). Shuttle controls 2713 allow the user to shuttle back and forth through the document by activating the page number control 2714. The particular page number shown in section 2704 is illustrated by display 2712.

With respect to the services and options section 2702, various services and options can be made available to the user. Included in section 2702 under document services is a document assembly service. In this manner, the user can send the document to be printed to an outside document assembly service if, for example, the document is too large for in-house equipment.

With respect to the printers and printing services, the user may be able to select the choices of finding the local printers, finding print services, adding a printer manually to the list 2701 of favorites, and clearing the favorites list 2701. These would be very helpful services if, for example, the user does not have access to a printer which is capable of printing the document on the desired print media.

Finally, with respect to the options portion of the services and options section 2702, this option would allow the user to interact with client-server system previously described.

It is to be understood that the various services and options shown in dialog box 2402 are for illustrative purposes only. Those skilled in the art would recognize that many other services and options could be shown in dialog box 2402 and, therefore, would be able to be utilized by the user.

After the user has reviewed the document or print preview image 2404, the user can select a printer 710 to print the document. This is done by selecting a printer (left clicking a mouse conventionally connected to computer 704 (FIG.1)). In this manner, browser 1412 (FIG. 8) of computer 704 interacts with server 1212 (FIG. 9) of printer 710, as previously discussed. Conventional sensors (not shown) connected to various parts of printer 710 conventionally provide feedback to server 1212 to tell browser 1412 and, ultimately the user, about the operating characteristics of printer 710. For example, the sensors could provide information as to the type and quantity of print media available in printer 710. Also, the sensors could tell the user if the printer is a monochrome or a color printer. The sensors could tell the user how much toner or other consumables are left in the printer. In short, the sensors could tell the user if the document to be printed, as shown in the print preview image 2404, can actually be printed by printer 710 or should the user select another printer and determine if that other printer can print the document, as desired. If the user selects another printer, printing device or printing service, browser 1412 interacts with the server of the other printer, printing device or printing service in the same manner, as discussed above. The server connected to that printer, printing device or printing service will relate information to the user regarding the capabilities of that other printer, printing device or printing service.

Figure 24:
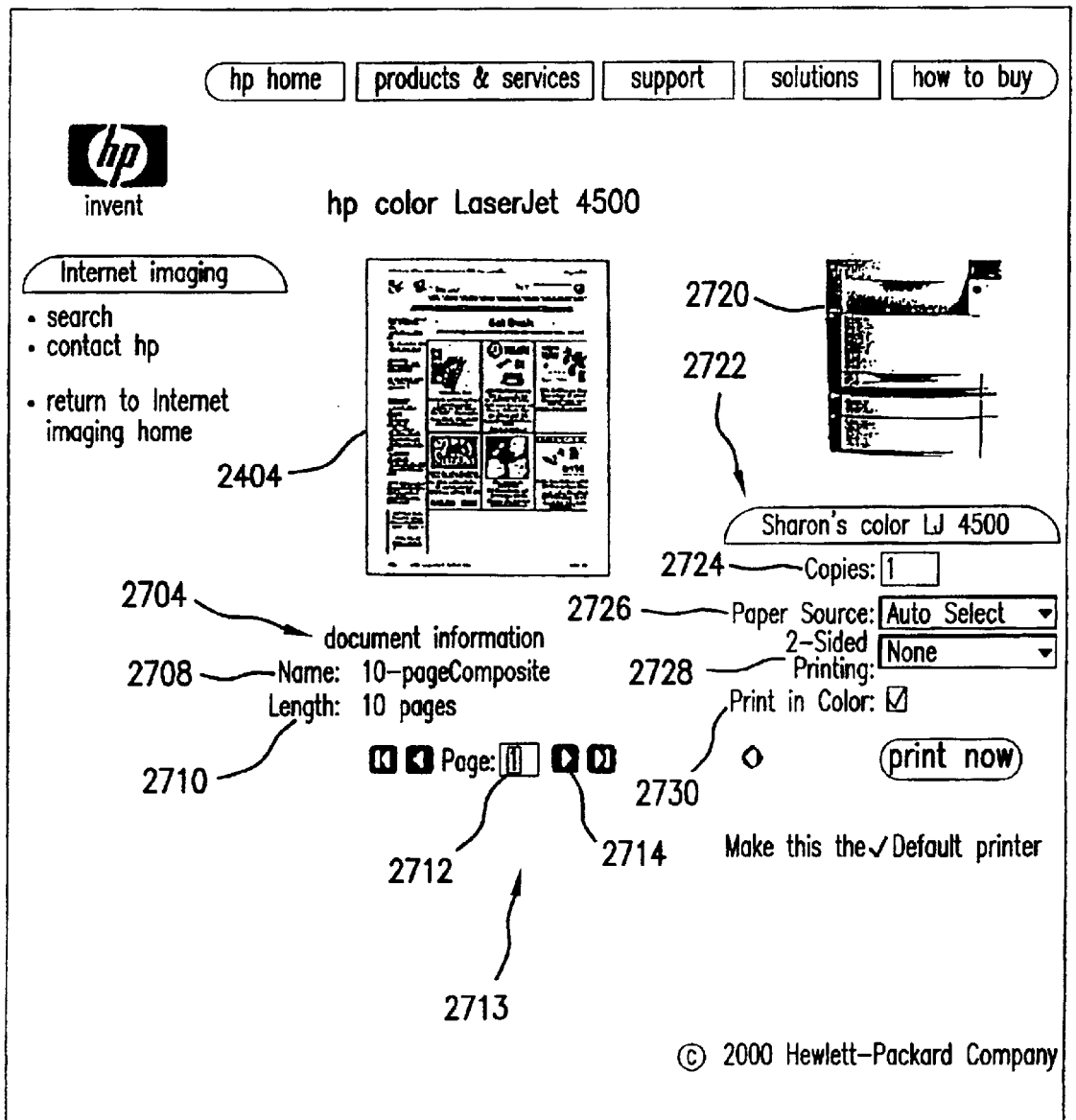
FIG. 24 illustrates a home page for the target printer.

FIG. 24 shows an example of a home page 2718 for a target printer. In this case, the target printer is printer 710. As can be seen, home page 2718 includes, in part, print preview image 2404 and document information section 2704. Section 2704 includes, but is not limited to, document name (2708), document length (2710), and a document page shuttle controls (2713). Shuttle controls 2713 allow the user to shuttle back and forth through the document by activating the controls 2714, as previously discussed.

An illustration 2720 of the type of printer to be used is provided. In this case, printer 710 is illustrated. A section 2722 is provided that includes, but is not limited to, the number of copies to be made (2724), the paper source (2726), duplexing capabilities (2728), color printing (2730), and a print button (2732). Section 2722 allows the user to select the number of copies to be printed at 2724 by conventionally typing in and/or scrolling the mouse of computer 704 (FIG. 7) (for example) to the desired number of copies. Also, the paper source 2726 can be selecting by scrolling the mouse (for example) to the desired paper source. Also, the user can opt for having the document duplexed by scrolling the mouse (for example) at 2728. Also, the user can choose to have the document to be printed in color by clicking the mouse (for example) on the box at 2730. It is to be understood that some of the various options on home page 2718 will only be shown if the sensors on printer 710 detect that these features, print media, print color and the like are available on printer 710. Once the user is satisfied with the print preview, as evidenced by print preview image 2404 and the capabilities of printer 710 to complete the print job, the user merely clicks the mouse (for example) on button 2410 and the document will be printed by printer 710.

Figure 25:
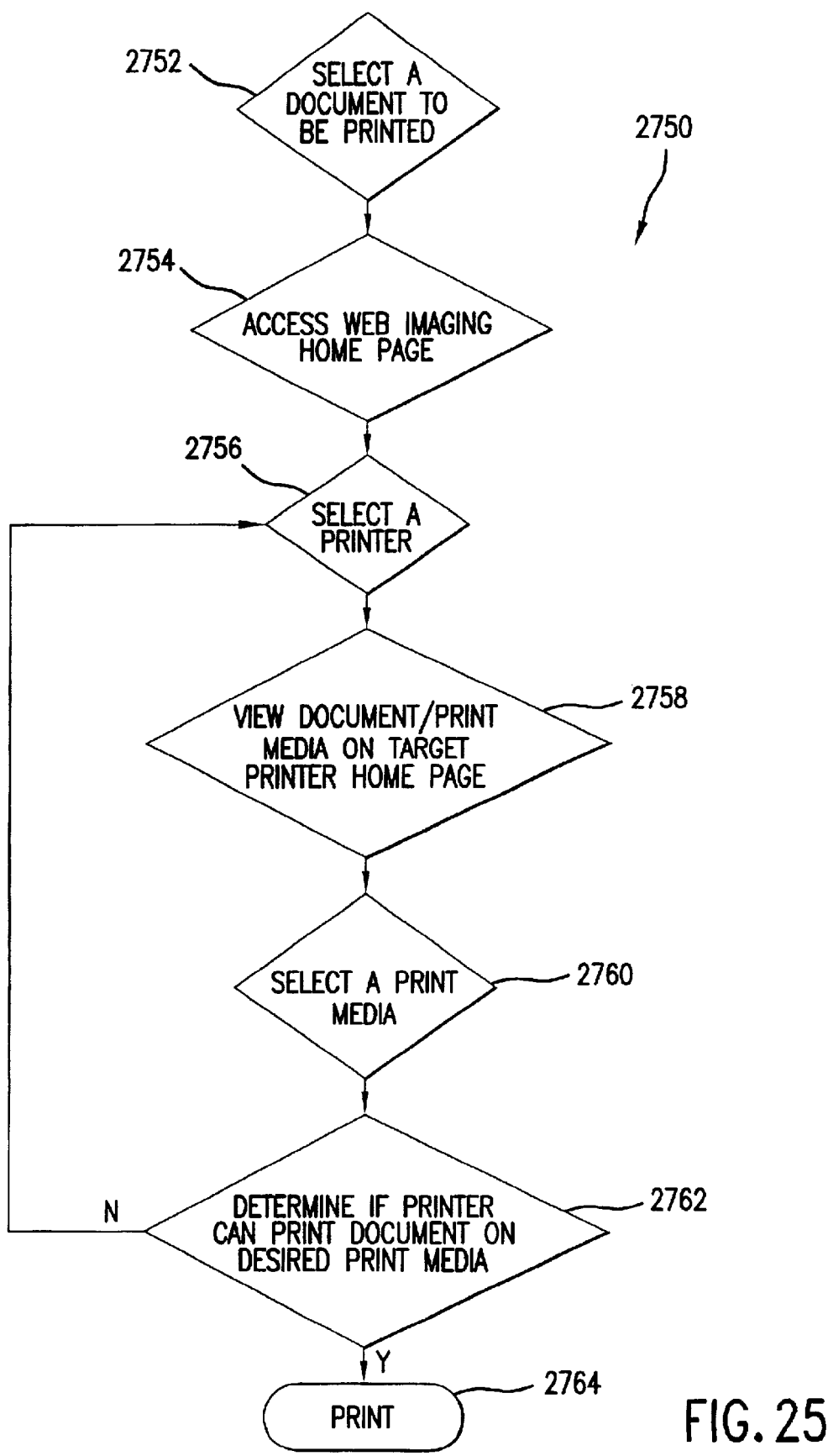
FIG. 25 is a flow chart that illustrates how the print preview system operates.

FIG. 25 shows the operation of the print preview/media selection method 2750 of the present invention. Method 2750 includes, in part, the steps of selecting a document to be printed, as shown in step 2752. The document can be selected from a variety of sources, as previously discussed. After the document is selected, the document is shown on the Web imaging home page by accessing the Web imaging home page, as shown in step 2754. Once the document is shown in the print preview image of the Web imaging home page, the user can select the printer to print the document, as shown in step 2756. After the printer has been selected, the user can view the document to be printed on the target printer home page, as shown in step 2758. The user can select the type of print media upon which the document will be printed, as shown in step 2760. The target printer home page will provide a preview of the document to be printed, along with a view of how the document will look on the desired print media, as shown in step 2762. In step 2762, the printer will provide information back to the user as to whether or not the target printer can complete the print job. Finally, once the user is satisfied with the print preview of the document, the user merely clicks the mouse (for example) on the print button 2410 and the document is printed, as shown in step 2764.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A method for print preview, wherein said method is comprised of the steps of:

selecting a document to be printed;

accessing a Web imaging home page;

selecting a target printer;

viewing an image of the document on a target printer home page;

selecting a media upon which the document is be printed;

determining if the target printer can print the document on the media; and printing the document on the media.

2. The method, as claim 1, wherein said document selecting step is further comprised of the step of:

composing a document to be printed.

3. The method, as claim 1, wherein said document selecting step is further comprised of the step of:

obtaining a target image from a first Web site.

4. The method, as in claim 1, wherein said viewing step is further comprised of the step of:

viewing a print preview image.

5. The method, as in claim 1, wherein said determining step is further comprised of the steps of:

viewing said document to be printed and said media upon which said document is to be printed; and interacting with said target printer.

6. The method, as in claim 5, wherein said interacting step is further comprised of the step of:

determining if said target printer contains said media.

7. The method, as in claim 5, wherein said interacting step is further comprised of the step of:

determining if said target printer contains a desired amount of media to print the document.

8. The method, as in claim 5, wherein said interacting step is further comprised of the step of:

determining if said target printer contains a desired color or colors in which said document is to be printed.

9. The method, as in claim 5, wherein said interacting step is further comprised of the step of:

determining if said target printer can print a desired number of copies of said document.

10. The method, as in claim 5, wherein said interacting step is further comprised of the step of:

determining if said target printer can duplex said document, if necessary, interacting between said browser and said server.

11. The method, as in claim 5, wherein said interacting step is further comprised of the steps of:

employing a browser located substantially within a computer;

establishing a connection between said browser and a server located substantially on a second computer; and interacting between said browser and said server.

12. The method, as in claim 1, wherein said method is further comprised of the step of:

showing a preview of said document on a target printer home page, interacting between said browser and said server.

13. The method, as in claim 5, wherein said interacting step is further comprised of the steps of:

employing a browser located substantially within a computer;

establishing a connection between said browser and a server located substantially on a first web site; and interacting between said browser and said server.

14. The method, as in claim 5, wherein said interacting step is further comprised of the steps of:

employing a browser located substantially within a computer;

establishing a connection between said browser and a server located substantially on a printer; and interacting between said browser and said server.

15. The method, as in claim 1, wherein said method is further comprised of the step of:

showing a preview of said document on a target printer home page.

16. A program storage medium readable by a computer, tangibly embodying a program of instruction executable by the computer to perform method steps for using a resource of an external device, the method steps comprising:

selecting a document to be printed;

accessing a Web imaging home page;

selecting a target printer;

viewing an image of the document on a target printer home page;

selecting a media upon which the document is be printed;

determining if the target printer can print the document on the media; and printing the document on the media.

* * * * *